US011895264B2

(12) United States Patent
Phatak et al.

(10) Patent No.: US 11,895,264 B2
(45) Date of Patent: Feb. 6, 2024

(54) FRAUD IMPORTANCE SYSTEM

(71) Applicant: PINDROP SECURITY, INC., Atlanta, GA (US)

(72) Inventors: Kedar Phatak, Atlanta, GA (US); Jayaram Raghuram, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 203 days.

(21) Appl. No.: 17/365,970

(22) Filed: Jul. 1, 2021

(65) Prior Publication Data

US 2022/0006899 A1 Jan. 6, 2022

Related U.S. Application Data

(60) Provisional application No. 63/047,593, filed on Jul. 2, 2020.

(51) Int. Cl.
*H04M 3/22* (2006.01)
*G06N 20/00* (2019.01)
*H04L 9/40* (2022.01)

(52) U.S. Cl.
CPC .......... *H04M 3/2281* (2013.01); *G06N 20/00* (2019.01); *H04L 63/1483* (2013.01)

(58) Field of Classification Search
CPC ......... H04M 3/2281; H04M 2203/556; H04M 2203/6027; H04M 3/5175; G06N 20/00;
(Continued)

(56) References Cited

U.S. PATENT DOCUMENTS 7,458,508 B1 * 12/2008 Shao ...................... G06Q 20/04
235/380
7,562,814 B1 * 7/2009 Shao ...................... G06Q 20/40
235/375
(Continued)

FOREIGN PATENT DOCUMENTS

WO WO-2019022903 A1 * 1/2019 ......... H04L 41/0273

OTHER PUBLICATIONS

International Preliminary Report on Patentability on PCT Application PCT/US2021/040128, dated Jan. 12, 2023 (7 pages).
(Continued)

*Primary Examiner* — Akelaw Teshale
(74) *Attorney, Agent, or Firm* — Foley & Lardner LLP

(57) ABSTRACT

Embodiments described herein provide for a fraud detection engine for detecting various types of fraud at a call center and a fraud importance engine for tailoring the fraud detection operations to relative importance of fraud events. Fraud importance engine determines which fraud events are comparative more important than others. The fraud detection engine comprises machine-learning models that consume contact data and fraud importance information for various anti-fraud processes. The fraud importance engine calculates importance scores for fraud events based on user-customized attributes, such as fraud-type or fraud activity. The fraud importance scores are used in various processes, such as model training, model selection, and selecting weights or hyper-parameters for the ML models, among others. The fraud detection engine uses the importance scores to prioritize fraud alerts for review. The fraud importance engine receives detection feedback, which contacts involved false negatives, where fraud events were undetected but should have been detected.

20 Claims, 10 Drawing Sheets

(58) Field of Classification Search
CPC ...... G06N 7/01; G06N 20/10; H04L 63/1483; H04L 63/1416; H04L 2463/121; H04L 63/1433; G06Q 20/4016
See application file for complete search history.

(56) References Cited

U.S. PATENT DOCUMENTS

| | | | |
|---|---|---|---|
| 7,813,944 B1 | 10/2010 | Luk et al. | |
| 9,294,497 B1* | 3/2016 | Ben-Or | H04L 63/1433 |
| 10,045,218 B1* | 8/2018 | Stapleton | G06N 5/01 |
| 10,091,349 B1* | 10/2018 | Rao | H04M 3/2218 |
| 10,204,374 B1* | 2/2019 | Holan | G06Q 30/0637 |
| 10,467,632 B1* | 11/2019 | Merritt | G06Q 30/0185 |
| 10,484,532 B1* | 11/2019 | Newman | H04W 12/12 |
| 10,509,890 B2* | 12/2019 | Van Arkel | G06Q 10/10 |
| 10,567,402 B1* | 2/2020 | Comeaux | G06N 5/01 |
| 10,825,028 B1* | 11/2020 | Kramme | G06N 5/046 |
| 10,958,779 B1* | 3/2021 | Rule | G06N 20/00 |
| 11,019,090 B1* | 5/2021 | Smith | G06F 21/40 |
| 11,100,506 B2* | 8/2021 | Zoldi | G06N 3/045 |
| 11,151,569 B2* | 10/2021 | Allbright | G06N 20/10 |
| 11,157,913 B2* | 10/2021 | Allbright | G06Q 20/4016 |
| 11,276,023 B1* | 3/2022 | Butler | G06Q 20/4016 |
| 11,379,855 B1* | 7/2022 | Anderson | G06N 20/00 |
| 11,410,062 B2* | 8/2022 | Wang | G06Q 30/0248 |
| 11,574,360 B2* | 2/2023 | Hanis | G06Q 40/02 |
| 11,625,723 B2* | 4/2023 | Pandian | G06N 20/00 705/39 |
| 11,669,844 B1* | 6/2023 | Comeaux | G06Q 30/0185 705/318 |
| 11,704,673 B1* | 7/2023 | Drapeau | G06Q 30/0185 705/72 |
| 11,727,406 B2* | 8/2023 | Hearty | G06F 21/577 705/35 |
| 11,756,050 B2* | 9/2023 | Wu | G06Q 40/12 705/30 |
| 2006/0149674 A1* | 7/2006 | Cook | G06Q 40/02 705/44 |
| 2009/0132347 A1* | 5/2009 | Anderson | G06Q 30/02 705/30 |
| 2011/0276468 A1* | 11/2011 | Lewis | G06Q 20/3674 705/38 |
| 2012/0158585 A1* | 6/2012 | Ganti | G06Q 20/40 705/44 |
| 2012/0158586 A1* | 6/2012 | Ganti | G06Q 20/405 705/44 |
| 2015/0073981 A1* | 3/2015 | Adjaoute | G06Q 20/384 705/39 |
| 2015/0269946 A1* | 9/2015 | Jones | H04M 3/42221 704/273 |
| 2016/0004979 A1* | 1/2016 | Getchius | G06N 20/00 706/12 |
| 2016/0307201 A1* | 10/2016 | Turgeman | G06F 21/316 |
| 2017/0063905 A1* | 3/2017 | Muddu | G06N 7/01 |
| 2018/0053114 A1* | 2/2018 | Adjaoute | G06N 20/00 |
| 2018/0239870 A1* | 8/2018 | Goldman | G16H 40/20 |
| 2018/0253737 A1* | 9/2018 | Hanis | G06Q 30/0185 |
| 2019/0073647 A1* | 3/2019 | Zoldi | G06Q 20/383 |
| 2019/0205885 A1* | 7/2019 | Lim | G06F 16/9566 |
| 2019/0295088 A1* | 9/2019 | Jia | G06N 5/04 |
| 2020/0005310 A1* | 1/2020 | Kumar | G06F 18/23213 |
| 2020/0118136 A1* | 4/2020 | Zhang | G06Q 20/405 |
| 2020/0211019 A1* | 7/2020 | Allbright | G06N 20/10 |
| 2020/0211021 A1* | 7/2020 | Allbright | G06Q 20/34 |
| 2020/0211022 A1* | 7/2020 | Allbright | G06Q 20/4093 |
| 2020/0250675 A1* | 8/2020 | Hanis | G06Q 20/4016 |
| 2020/0258181 A1* | 8/2020 | Song | G06Q 40/02 |
| 2020/0311736 A1* | 10/2020 | Song | G06Q 20/4014 |
| 2020/0334687 A1* | 10/2020 | Ren | G06N 20/00 |
| 2020/0349575 A1* | 11/2020 | Karmakar | G06F 17/15 |
| 2020/0364366 A1* | 11/2020 | Kundu | H04L 63/102 |
| 2020/0404094 A1* | 12/2020 | Roderick | H04L 63/1425 |
| 2021/0117977 A1* | 4/2021 | Kim | G06F 18/214 |
| 2022/0329328 A1* | 10/2022 | Paulraj | H04B 17/11 |
| 2023/0126764 A1* | 4/2023 | Ibrahim | G06N 20/10 705/44 |
| 2023/0206372 A1* | 6/2023 | Ordorica | H04L 63/0861 705/325 |

OTHER PUBLICATIONS

International Search Report and Written Opinion for PCT/US2021/040128 dated Oct. 5, 2021 (13 pages).

* cited by examiner

Fraud Importance Configuration UI - Credit Card

| Credit Card Loss | |
|---|---|
| Loss Amount | Weight |
| $0.00 | 0.9 |

| Credit Card Balance | |
|---|---|
| Loss Amount | Weight |
| $0.00 | 0.9 |

| Age Based Fraud Importance | |
|---|---|
| Age in Days | Weight |
| 30 Days | 0.5 |

| False Negatives |
|---|
| Weight |
| 0.5 |

| Activity | Weight |
|---|---|
| Information Phishing | 0.1 |
| Update Information | 0.5 |
| Balance Transfer | 1.0 |
| Travel Notice | 0.5 |
| New Credit Card Order | 0.5 |
| Adding Authorized Users | 0.5 |
| More | 0.5 |

| Fraud Type | Weight |
|---|---|
| Phishing | 0.2 |
| Account Takeover | 0.8 |
| First Party Fraud | 0.0 |
| More | |

| Spoofing | Weight |
|---|---|
| No Spoofing | 0.0 |
| ANI Spoofing | 0.8 |
| Voice Spoofing | 0.8 |
| More | |

| Fraudsters | Weight |
|---|---|
| Fraudster A | 0.9 |
| Fraudster B | 0.8 |
| Fraudster C | 1.0 |
| More | |

| Authentication | Weight |
|---|---|
| Failed Authentication | 0.1 |
| Passed Primary Authentication | 0.6 |
| Passed Step up Authentication | 1.0 |
| More | |

FIG. 8

Fraud Importance Configuration UI - Retail

| Order Amount | |
|---|---|
| Loss Amount | Weight |
| $0.00 | 0.9 |

| Age Based Fraud Importance | |
|---|---|
| Age in Days | Weight |
| 30 Days | 0.5 |

| False Negatives |
|---|
| Weight |
| 0.5 |

| Activity | Weight |
|---|---|
| Large Orders | 0.8 |
| Expedite Shipping | 0.3 |
| Change of Delivery Address | 1.0 |
| More | 0.5 |

| Fraud Type | Weight |
|---|---|
| Employee Fraud | 0.2 |
| Discount Abuse | 0.8 |
| Refund Fraud | 0.0 |
| Wardrobing | 0.5 |

| Spoofing | Weight |
|---|---|
| No Spoofing | 0.0 |
| ANI Spoofing | 0.8 |
| Voice Spoofing | 0.8 |
| More | |

| Fraudsters | Weight |
|---|---|
| Fraudster A | 0.9 |
| Fraudster B | 0.8 |
| Fraudster C | 1.0 |
| More | |

Fraud Importance Configuration UI - Insurance

| Fraud Type | Weight |
|---|---|
| Misrepresentation | 0.2 |
| First Party Fraud | 0.8 |
| Third Party Fraud | 1.0 |
| More | |

| Activity | Weight |
|---|---|
| False Insurance Claims | 0.9 |
| Inflated Claims | 0.7 |
| False Natural Disaster Claims | 0.1 |

| Spoofing | Weight |
|---|---|
| No Spoofing | 0.0 |
| ANI Spoofing | 0.9 |
| Voice Spoofing | 0.8 |
| More | |

| Fraudsters | Weight |
|---|---|
| Fraudster A | 0.9 |
| Fraudster B | 0.8 |
| Fraudster C | 1.0 |
| More | |

| Type of Insurance | Weight |
|---|---|
| Life | 0.2 |
| Health Care | 0.6 |
| Auto | 0.7 |
| Home/Rental | 0.8 |

| Authentication | Weight |
|---|---|
| Failed Authentication | 0.1 |
| Passed Primary Authentication | 0.6 |
| Passed Step up Authentication | 1.0 |
| More | |

Insurance claim amount
Amount: $0.00  Weight: 0.5

Insurance Coverage
Amount: $0.00  Weight: 0.75

Monetary Loss
Amount: $0.00  Weight: 1.0

Fraud - Age
Age in Days: 30  Weight: 0.6

Account - Age
Age in Days: 365  Weight: 0.5

False Negatives
Weight: 0.5

FRAUD IMPORTANCE SYSTEM

CROSS-REFERENCE TO RELATED APPLICATIONS

This application claims priority to U.S. Provisional Application No. 63/047,593, filed Jul. 2, 2020, which is incorporated by reference in its entirety.

This application generally relates to U.S. application Ser. No. 15/262,748, entitled "End-To-End Speaker Recognition Using Deep Neural Network," filed Sep. 12, 2016, issued as U.S. Pat. No. 9,824,692, which is incorporated by reference herein in its entirety.

This application generally relates to U.S. application Ser. No. 15/910,387, entitled "Method and Apparatus for Detecting Spoofing Conditions," filed Mar. 2, 2018, issued as U.S. Pat. No. 10,692,502, which is incorporated by reference herein in its entirety.

This application generally relates to U.S. application Ser. No. 17/155,851, entitled "Robust Spoofing Detection System Using Deep Residual Neural Networks," filed Jan. 22, 2021, which is incorporated by reference herein in its entirety.

This application generally relates to U.S. application Ser. No. 17/192,464, entitled "Systems and Methods of Speaker-Independent Embedding for Identification and Verification from Audio," filed Mar. 4, 2021, which is incorporated by reference herein in its entirety.

This application generally relates to U.S. application Ser. No. 17/165,180, entitled "Cross-Channel Enrollment and Authentication of Voice Biometrics," filed Feb. 2, 2021, which is incorporated by reference herein in its entirety.

TECHNICAL FIELD

This application generally relates to systems and methods for managing, training, and deploying ML architecture for audio processing. In particular, this application relates to deploying a fraud detection engine that operates relative to tailored fraud importance for the various types of fraud events.

BACKGROUND

Enterprise call centers are typically protected against fraudulent activities through various machine-learning (ML) software that detect various types of fraud. Automatic Speech Recognition (ASR) and Automatic Speaker Verification (ASV) systems are often used for security and authentication features, as well as other voice-based operations. Speaker-independent feature of call data can be used to evaluate, for example, the types of devices, the communications channels, the geographic location, and the like. Similarly, call centers employ fraud detection functions evaluating various forms of communications channels, including Internet of Things (IoT) devices for communications via computing networks or telephone calls of various forms, such as landline telephone calls, cellular telephone calls, and Voice-over-IP (VoIP) calls, among others. Enterprises typically provide additional contact channels through the Internet, such as websites displaying service offerings or purchases. Fraud detection operations can employ cross-channel fraud risk assessments using contact data acquired from contacts (e.g., inbound calls or inbound data traffic) through various different channels.

Some conventional fraud detection software adapts to variations in the characteristics of contact data indicating fraud. The problem, however, is that many conventional fraud detection functions do not fully account for the dynamic nature of fraudulent activities. The fraud activities are diverse and evolve continually. Nor do the ML models in conventional approaches adapt to the particular business needs. Certain types of fraud events are more impactful and financially damaging than others. Consequently, conventional fraud detection approaches operate, less-than-optimally, under an assumption that all fraud events must be treated equally.

SUMMARY

Disclosed herein are systems and methods capable of addressing the above-described shortcomings and may also provide any number of additional or alternative benefits and advantages. Embodiments described herein provide for a dynamic mechanism that determines which fraud events are more important than other fraud events and performs various anti-fraud operations accordingly. A fraud detection engine comprises a ML architecture with ML models that consume the contact data of contact events and fraud importance information for various processes and prioritizes important fraud events detected by the fraud detection engine.

The embodiments include a fraud importance engine that calculates an importance score for fraud events (sometimes called "fraud importance") based on several user-selected or user-customized attributes defined by the user. The attributes are categories or fields for certain types of data. Examples of the attribute categories or fields include fraud type, fraud activity, cross-channel fraud activity, penetration level into authentication systems, account related information, fraudsters, spoofing related information, and temporal information, among others. The ML architecture of the fraud detection engine consumes the one or more fraud importance scores generated for the fraud events and uses the fraud importance score in various downstream processes, such as ML model training, ML model selection, selecting optimum weights and/or hyper-parameters for the ML models, and calculating performance metrics to tune optimal detection performance, among other processes. The fraud detection engine uses the fraud importance score to sort or prioritize fraud alerts according to the fraud importance scores of the fraud alerts.

The fraud detection engine and fraud importance engine receive fraud detection feedback, generated automatically by other software functions or entered manually by a user. The fraud events detected by the fraud detection engine are reviewed for accuracy and a computing device generates a list of feedback corresponding to the detected fraud events, indicating whether each fraud event is, for example, a false negative, when the fraud event was undetected by should have been detect. The false negatives can be employed to generate or update a fraud importance score, which is then used to, for example, update or retrain the ML models of the fraud detection engine.

In an embodiment, a computer-implemented method comprises receiving, by a computer, one or more parameters comprising one or more attributes, one or more attribute values, and one or more attribute weights; generating, by the computer, one or more risk scores for one or more types of fraud corresponding to the one or more attributes based upon by applying a machine-learning architecture comprising one or more machine-learning models on contact data of one or more contacts; identifying, by the computer, a plurality of fraud events in the one or more contacts, each fraud event associated with a risk score of a machine-learning model of the machine-learning architecture satisfying a risk threshold; for each fraud event, generating, by the computer, a fraud importance score according to the one or more parameters; and generating, by the computer, a fraud alert in a fraud alert queue according to the fraud importance score.

In another embodiment, a system comprises a database comprising non-transitory memory configured to store a plurality of machine-learning models of a machine-learning architecture; and a server comprising a processor configured to: receive one or more parameters comprising one or more attributes, one or more attribute values, and one or more attribute weights; generate one or more risk scores for one or more types of fraud corresponding to the one or more attributes based upon by applying the machine-learning architecture comprising the one or more machine-learning models on contact data of one or more contacts; identify a plurality of fraud events in the one or more contacts, each fraud event associated with a risk score of a machine-learning model of the machine-learning architecture satisfying a risk threshold; for each fraud event: generate a fraud importance score according to the one or more parameters; and generate a fraud alert in a fraud alert queue according to the fraud importance score.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 8 shows the screenshot of a credit card configuration UI (card UI) for a credit card business.

FIG. 9 shows the screenshot of a retail configuration UI (retailer UI) for a retail business.

FIG. 10 shows the screenshot of an insurance configuration UI (insurer UI) for an insurance business.

DETAILED DESCRIPTION

Figure 1:
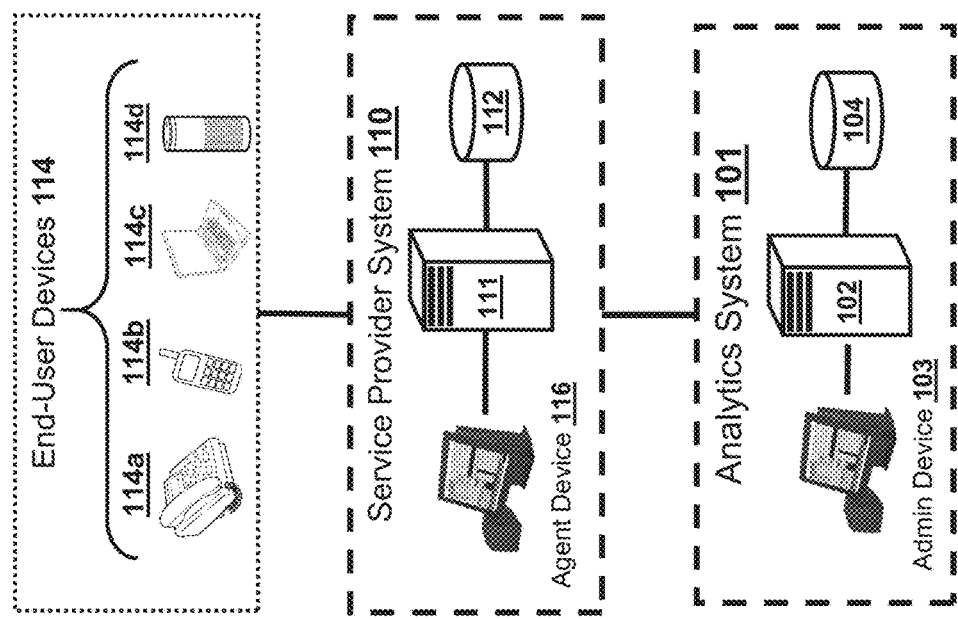
FIG. 1 shows components of a system for receiving and analyzing telephone calls, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Overview

Described herein are systems and methods for processing various types of data associated with inbound contacts (e.g., inbound calls, inbound data traffic), including protocol metadata, end-user inputs, and audio signals to determine a risk of fraud associated with calls or data traffic directed to an enterprise's customer contact channel (e.g., call center, website). The system receives calls or data traffic through any number of channels, such as typical telephony networks or data communications networks (e.g., Internet, private intranet). Computing devices of the enterprise's call center or website capture, store, and forward the contact data (e.g., audio data, metadata) to a server that performs various analytics operations on the contact data. The data analytics operations identify and evaluate fraud indicators in the contact data to detect fraud events arising in the contacts, which includes determining a relative fraud importance score for each fraud event. The data analytics operations could also include performing fraud assessments, speaker recognition, and speaker authentication. The server comprises machine-executable software that functions as a fraud detection engine and a fraud importance engine. The fraud detection engine comprises any number of machine learning (ML) algorithms and models for evaluating various types of contact data to generate a fraud risk score indicating the likelihood that fraud is associated with a particular contact, thereby detecting a fraud event for the contact. The fraud importance engine (sometimes referred to as a "fraud importance calculator") generates a fraud importance score for each fraud event, which the server employs for various downstream processes. For example, the fraud importance score is used by the server for training the fraud importance engine (model training), selecting a particular model when executing the fraud detection engine (model selection), optimizing weights of the ML models, when executing a model ensemble process, calculating performance metrics, and updating and prioritizing fraud alerts of a an alert queue.

Attribute Parameters for Fraud Importance Engine

In particular, the server performing the analytics operations executes a fraud detection engine and a fraud importance calculator. The server calculates a fraud importance score for fraud events based on several custom attributes defined by a user (e.g., administrator, call center agent). The attributes belong to categories (or types) of attributes, such as fraud-type, fraud activity (or cross-channel fraud activity), authentication results (or penetration level into authentication systems), account-related information, fraudsters, spoofing-related information, and temporal information. The user enters configuration parameters to the server via a configuration user interface (UI) to define the attributes to calculate fraud importance scores.

Non-limiting examples of the categories of the attributes (types of attributes) used to calculate the fraud importance score include:

Fraud Type: the type of fraud is based upon, for example, the type of fraudster or type of the victim affected by a fraud event.

Individual Level Fraud: types of fraud in which the individual who is the customer of the enterprise institution commits a fraud against the institution by providing misinformation or misrepresentation (e.g., falsely disputing the transactions, falsely filing for insurance claims to commit insurance fraud).

First Party Fraud: this is the type of fraud in which the fraudster is closely associated with the victim or targeted enterprise. The fraudster typically has easy access to the personal identifiable information (PII) necessary to commit fraud, such as instances where the fraudster is spouse, or where a business associate/partner defrauds the business or enterprise.

Third Party Fraud: In this type of fraud typically the fraudsters are professionals who steal the PII of the victim and commit fraud.

Fraud Activity: this is an action or series of actions performed by a fraudster to further the fraudster's effort to commit a particular type of fraud. The fraud activities vary based on business type or the monetary effect. Hence, the fraud activity provides useful information in determining fraud importance scores. Non-limiting examples of fraud activities include updating account information, performing a wire transfer or ACH transfer, ordering new credit cards, opening new accounts, or check fraud, among others.

Cross-Channel Fraud Activities: there are various channels through which a fraudster may commit fraud. Non-limiting examples include fraud committed over phone channels in enterprise call centers, fraud committed online by accessing accounts online, and fraud committed through mobile application, among others. This cross-channel fraud information associated with the account provides valuable information to calculate the importance of the fraud.

Penetration Level Into Authentication System: for enterprises that directly service customers (e.g., banks, brokerage firms, insurance companies, retailers, e-commerce) offer access to the services via different channels, such as brick-and-mortar stores, phone channel by establishing call centers, online channels by establishing websites or mobile phone applications. These enterprises popularly use Knowledge Based Authentication (KBA) processes to verify customers. In the KBA authentication process, the enterprise computing systems store and reference the PII of customers. In order to pass the KBA authentication, an end-user (e.g., genuine customer, fraudster) claiming the identity of a particular customer must provide correct PII information as requested. The KBA authentication system generally two types: static KBA that typically comprise shared secret information (e.g., account number, tax identification number, phone number, mailing, email address), and dynamic KBA that is more sophisticated than static KBA in which the questions and answers are not provided to the end-user beforehand and vary for the particular authentication session.

In the embodiments described herein, the penetration level into authentication system is represented as the authentication results of the end-user's authentication attempt. For instance, the fraud importance system includes attribute values of "failed authentication" or "successful authentication." Some authentication systems, however, employ multiple levels of authentication relative to services that the end-user attempts to access. For example, a comparatively easier form of authentication is employed at initial contact, and a comparatively more difficult (or "stepped up") form of authentication is employed when the end-user requests access to a service to transfer money to another account. In this example, the parameter values would be "failed authentication," "satisfied first authentication," "satisfied stepped up authentication." Higher the penetration into authentication systems results in comparatively higher risk weighted values associated with fraud events, and thus could be used to calculate the fraud importance score.

Fraudsters: the fraudsters are individuals or groups of individuals who commit fraud. Certain fraudsters may cause more monetary damage by committing fraud than others. These fraudsters may have their unique techniques, modus operandi (MO) to commit fraud. The fraudster information can be used to calculate fraud importance score.

Spoofing-Related Information: spoofing is the act of disguising the source on a communication channel (e.g., email, websites, phone numbers), misrepresenting an unknown source as a known, trusted source. Voice spoofing techniques, such as voice conversion and replay attacks, are used to confuse automatic speaker verification (ASV) systems. The use of spoofing and type of spoofing indicates a level of sophistication of the technique acquired by the fraudsters to commit fraud. This information can be used to calculate fraud importance. The spoofing related information for a fraud event can be obtained either by spoof detection system or by manual review process.

Account-Related Information: the account-related information can be of various types (e.g., balance on the account, account activities, information on the file for account, age of the account). This account-related information is valuable to calculate fraud importance.

False Negative information: The false negatives are the fraud events that are not alerted by the fraud detection system. The false negative feedback is important to improve the performance fraud detection system. The false negative information can be used to calculate the fraud importance as well. The user can choose a weight for false negatives. This weight is assigned to all the false negative fraud events to calculate the fraud importance.

Data Used by the Fraud Detection Engine and Fraud Importance Engine

The ML algorithms of the fraud detection engine consume the call data and fraud importance score of the fraud events and uses the fraud importance score for the various fraud detection processes, as well as other downstream processes, such as model training, model selection, optimum weight selection for models, and calculating performance metrics to determine the optimal detection performance based upon the fraud events with comparatively higher fraud importance scores as compared against fraud events with comparatively lower fraud importance scores. A call center agent or other user of the fraud detection system can inputs the fraud importance score into a client device to prioritize fraud alerts for fraud events according to the comparative fraud importance scores of the fraud events.

The fraud importance score enables the fraud detection engine to account for the diversity and evolution of fraud. Oftentimes, the amount of fraud data available is extremely small as compared to genuine data. The fraud data comes from different individuals who commit fraud ("fraudsters"). The fraudsters employ a diverse array of approaches to commit fraud, and the fraudsters regularly evolve those approaches to the defense mechanisms implemented by fraud detection engines (or other security system, such as authentication systems), resulting in new ways to commit fraud. The fraud patterns not only evolve systematically but also evolve over time.

In temporal point of view, some types of fraud occur in a seasonal fashion, some types of fraud occur in a short period (or burst) of time, and some types of fraud has no temporal pattern at all. A component of the fraud importance calculation includes a fraud rate, defined as a ratio of an amount of fraud events to an amount of genuine events for a given period of time. The fraud rate changes or varies over time. For instance, the fraud rate is expectedly higher in certain time-periods compared to other periods of time.

Moreover, the types of fraud observed typically vary based upon the type of business targeted by the fraud. As an example, in financial institutions, the fraudsters try phishing for account-holder information (e.g., phone number, email address, mailing address) or account information (e.g., available balance in the account). In some instances, the fraudster seeks such information for later fraud attempts. For instance, the fraudster might attempt to confirm whether certain individuals even hold an account at the targeted institution. The fraudsters might attempt to alter account-holder or account information on file, such as mailing address, phone number, or email address on the account, to isolate the actual account-holder from the account. To gather an increasing amount of information about the account, the fraudster initiates multiple instances of fraudulent contact events and/or various types of fraud, which may or may not result in monetary loss to the targeted institution or account-holder. In other examples, at insurance institutions, fraudsters try to commit insurance fraud; at retail institutions, fraudsters steal merchandise sold by retailers by buying and shipping new merchandise or changing the shipping address of existing order, and so forth. Consequently, the monetary loss experienced by each type of institution per fraud event may vary a lot.

As there is a diversity in fraudulent actions and the respective impacts, detecting certain fraudulent events is comparatively important than others. For example, for some financial institutions, detecting account takeover (ATO) fraud is comparatively more important than detecting phishing fraud. For other financial institutions, however, detecting a pre-ATO fraud, such as phishing, might be comparatively more important than the ATO fraud itself those pre-ATO fraud activities may lead to actual ATO in future. Similarly, detecting a fraud event that resulted in monetary loss is more important than detecting ATO fraud; or detecting a fraud event that resulted in monetary loss of millions of dollars is more important than losses of hundreds of dollars.

A fraud detection engine generates fraud alerts for high-risk fraud events having assigned fraud importance scores satisfying a particular threshold and stored into a database. The server or client device executes an automatic or a manual review process. The server determines or a user enters into a user interface (UI) of the client device a confirmation disposition that indicates whether the particular fraud event was a true fraud attempt or false alarms. If a fraud alert is generated for a confirmed fraud event, then the fraud alert and fraud event are a "True Positive" (TP). If the fraud alert is generated inaccurately for a confirmed non-fraud event, resulting in a false alarm, then the fraud alert and fraud event equate to a "False Positive" (FP). If a fraud alert is not generated for an overlooked, confirmed fraud event, then the failure to generate the fraud event and fraud event result in a "False Negative" (FN). If the server did not generate a fraud alert because no fraud event occurred, then the non-alert and non-event amount to a "True Negative" (TN). The goal of the fraud detection engine is to detect the maximum number of fraudulent attempts (TPs) and minimizing the number of false alerts (FPs) generated by the fraud detection engine. The fraud detection is a multi-objective optimization problem. The server determines the performance metrics to measure and adjust the ML model of the fraud detection engine.

The typical performance metrics generally include a True Positive Rate (TPR) and False Positive Rate (FPR), but could also include, for example, False Negative Rate (FNR), among others. The TPR is a ratio of the amount of TPs over the total amount of TPs and FNs. Likewise, the FPR is the ratio of the amount of FPs over the total amount of FPs and TNs. Generally, the value of the FPR directly affects the review mechanism, where the final metric used by the server is a relation of the TPR and FPR. For example, the TPR is at 1% of the FPR.

The embodiments of a fraud importance engine described herein modify the conventional metrics (e.g., TPR, FPR) generally used for performance measurement and optimization of fraud detection engines, such that these conventional metrics are modified to account for and develop the fraud importance score. To account for the diverse and evolving nature of the fraud threat landscape, embodiments employing the fraud importance engine can determine and use weighted performance metrics, such as a Weighted TPR (WTPR) and Weight False Positive Rate (WFPR):

$$WTPR=\Sigma(TP_i \times W_i)/(\Sigma(TP_i \times W_i)+\Sigma(FN_i \times W_i))$$

$$WFPR=\Sigma(FP_i \times W_i)/(\Sigma(FP_i \times W_i)+\Sigma(FN_i \times W_i))$$

In the above calculations, $W_i$ represents a weight or fraud importance associated with the particular fraud event (i). To calculate the value of $W_i$, the server considers and adjust calculations according to various attributes of fraud, such as type of fraud, fraud activity, cross channel activities, penetration level into authentication systems, account related information, value of monetary exposure or monetary loss, spoofing related information, and temporal information, among others. In the embodiments described herein, the server calculates the fraud importance weight ($W_i$) for each fraud event (i) according to the attributes defined by the user of the fraud detection engine.

For ease of description, embodiments described herein contemplate monitoring an enterprise call center for fraud events occurring through various contact channels configured to receive inbound calls from end-users, but embodiments are no so limited. Some embodiments, such as the embodiment described in FIG. 6, include additional or alternative contact channels comprising computing and networking devices configured to receive inbound data traffic from end-user devices via the Internet, intranet, or other web-based computing network.

EXAMPLE EMBODIMENTS

FIG. 1 shows components of a system 100 for receiving and analyzing telephone calls. The system 100 comprises a call analytics system 101, call center systems 110 (sometimes referred to as service provider systems) of customer enterprises (e.g., companies, government entities, universities), and caller devices 114. The call analytics system 101 includes analytics servers 102, analytics databases 104, and admin devices 103. The call center system 110 includes call center servers 111, call center databases 112, and agent devices 116. Embodiments may comprise additional or alternative components or omit certain components from those of FIG. 1, and still fall within the scope of this disclosure. It may be common, for example, to include multiple call center systems 110 or for the call analytics system 101 to have multiple analytics servers 102. Embodiments may include or otherwise implement any number of devices capable of performing the various features and tasks described herein. For example, the FIG. 1 shows the analytics server 102 as a distinct computing device from the analytics database 104. In some embodiments, the analytics database 104 may be integrated into the analytics server 102.

Various hardware and software components of one or more public or private networks may interconnect the various components of the system 100. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the end-user devices 114 may communicate with callees (e.g., provider systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Various different entities manage or organize the components of the telecommunications systems, such as carriers, networks, and exchanges, among others.

The caller devices 114 (sometimes referred to as "end-user devices") may be any communications or computing device that the caller operates to access the services of the call center system 110 through the various communications channels. For instance, the end-user may place the call to the call center system 110 through a telephony network or through a software application executed by the caller device 114. Non-limiting examples of caller devices 114 may include landline phones 114a, mobile phones 114b, calling computing devices 114c, or edge devices 114d. The landline phones 114a and mobile phones 114b are telecommunications-oriented devices (e.g., telephones) that communicate via telecommunications channels. The caller devices 114, however, are not limited to the telecommunications-oriented devices or channels. For instance, in some cases, the mobile phones 114b may communicate via a computing network channel (e.g., the Internet). The caller device 114 may also include an electronic device comprising a processor and/or software, such as a calling computing device 114c or edge device 114d implementing, for example, voice-over-IP (VoIP) telecommunications, data streaming via a TCP/IP network, or other computing network channel. The edge device 114d may include any Internet of Things (IoT) device or other electronic device for computing network communications. The edge device 114d could be any smart device capable of executing software applications and/or performing voice interface operations. Non-limiting examples of the edge device 114d may include voice assistant devices, automobiles, smart appliances, and the like.

The call analytics system 101 and the call center system 110 represent network infrastructures 101, 110 comprising physically and logically related software and electronic devices managed or operated by various enterprise organizations. The devices of each network system infrastructure 101, 110 are configured to provide the intended services of the particular enterprise organization.

The call center system 110 comprises various hardware and software components that capture and store various types of call data, including audio data or metadata related to the call received at the call center system 110. The call data may include, for example, audio data (e.g., audio recording, audio segments, acoustic features), caller information, and metadata (e.g., protocol headers, device identifiers) related to particular software (e.g., Skype, codecs) and protocols (e.g., TCP/IP, SIP, SS7) used to execute the call via the particular communication channel (e.g., landline telecommunications, cellular telecommunications, Internet). The call center system 110 is operated by a particular enterprise to offer various services to the enterprise's end-users (e.g., customers, account holders). The call center system 110 includes a call center server 111 or other computing device that executes various operations related managing the inbound calls. These operations include receiving or generating various forms of call data, and forwarding the call data to the analytics system 101.

An analytics service operates the analytics system 102 to perform various call analytics operations on behalf of the enterprise's call center system 110. The analytics operations include, for example, fraud detection and caller authentication.

Analytics Server

The analytics server 102 of the call analytics system 101 may be any computing device comprising one or more processors and software, and capable of performing the various processes and tasks described herein. The analytics server 102 may host or be in communication with the analytics database 104, and receives and processes call data (e.g., audio recordings, metadata) received from the one or more call center systems 110. Although FIG. 1 shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the call center system 110 (e.g., the call center server 111).

The analytics server 102 executes data analysis and audio-processing software that includes machine-learning (ML) software routines organized as a ML architecture or model, such as a Gaussian Mixture Matrix (GMM) or a neural network, configured to perform the functions of a fraud detection engine and fraud importance engine, among other functions described herein. The ML architecture of the fraud detection engine ingests the call data to perform various anti-fraud or authentication (e.g., speaker spoof detection, speaker recognition, speaker verification or authentication, speaker diarization) to determine a fraud risk score representing the likelihood that the call is associated with fraud. The fraud importance engine ingests the call data and, in some cases, the fraud events detected by the fraud detection engine, which the fraud detection engine uses to determine a fraud importance score associated with each fraud event. The fraud importance score represents the relative criticality of each particular fraud event based upon user configurations for the fraud importance engine's calculations.

Fraud Detection Engine

The fraud detection engine operates logically in several operational phases, including a training phase for training the models of the ML architecture, a deployment phase (sometimes referred to as a test phase or testing) when the server applies the ML architecture of the fraud detection engine to current inbound call data, and optionally an enrollment phase in which the server develops the trained ML architecture to tailor one or more models for particular callers or caller devices 114. The fraud importance engine outputs fraud importance scores that inform the fraud detection engine's results in each of the operational phases. The call data processed by the analytics server 102 could include training data, enrollment data, or inbound call data (processed during the deployment phase). The analytics server 102 applies the ML architecture of the fraud detection engine to each type of inputted call data during the corresponding operational phase. During training, for example, the fraud importance engine generates fraud importance scores for fraud events in the training call data, thereby accentuating features of the training call data and hyper-parameters of the ML architecture. As another example, during the testing phase, the fraud detection engine generates fraud event alerts according to the relative fraud importance scores.

In some implementations, the analytics server 102 or other computing device of the system 100 (e.g., call center server 111) performs various pre-processing operations and/or data augmentation operations on the input call data. Non-limiting examples of the pre-processing operations include extracting low-level features from an audio signal, parsing and segmenting the audio signal into frames and segments and performing one or more transformation functions, such as Short-time Fourier Transform (SFT) or Fast Fourier Transform (FFT), among other potential pre-processing operations. Non-limiting examples of augmentation operations include audio clipping, noise augmentation, frequency augmentation, duration augmentation, and the like. The analytics server 102 may perform the pre-processing or data augmentation operations before feeding the input call data into input layers of the fraud detection engine's ML architecture. Alternatively, the analytics server 102 may execute the pre-processing or data augmentation operations as part of executing the ML architecture, where input layers (or other layers) of the ML architecture perform these operations. For instance, the ML architecture may comprise in-network data augmentation layers that perform data augmentation operations on the input call data fed into the ML architecture.

During the training phase of the fraud detection engine, the analytics server 102 receives the training call data comprising various lengths and characteristics from one or more corpora, stored in a database 104, 112 or some other storage media. The training call data includes clean audio signals (sometimes referred to as "samples") and simulated audio signals, each of which the analytics server 102 uses to train models of the ML architecture to, for example, recognize speech, speakers, or devices, or identify spoofing. The clean audio signals are audio samples containing speech in which the speech is identifiable by the analytics server 102. Certain data augmentation operations executed by the analytics server 102 retrieve or generate the simulated audio signals for data augmentation purposes during training or enrollment. The training or enrollment call data may include any type of call data, including metadata, audio data, and speaker-independent characteristics, among others. The data augmentation operations may generate additional versions or segments of a given training call data containing manipulated features mimicking a particular type of signal degradation or distortion. The analytics server 102 stores the training call data into the non-transitory medium of the analytics server 102 or the analytics database 104 for future reference or operations of the ML architecture. The analytics server 102 identifies the one or more fraud events in the training data according to labels or user inputs, and selects and weighs the particular ML models to train for the fraud importance engine In some embodiments, during the fraud detection engine's training phase or optional enrollment phase, fully-connected layers of the ML architecture generate a training feature vector for each of the many training audio signals and a loss function (e.g., LMCL) determines levels of error for the plurality of training feature vectors. A classification layer of the neural network architecture adjusts weighted values (e.g., hyper-parameters) of the ML architecture until the outputted training feature vectors converge with predetermined expected feature vectors. When the training phase concludes, the analytics server 102 stores various types of data (e.g., weighted values, ML architecture, models, fraud importance parameters) into the analytics database 104 or the non-transitory storage media (e.g., memory, disk) of the analytics server 102. In some implementations, during the enrollment and/or the deployment phases, the analytics server 102 disables one or more layers of the ML architecture (e.g., fully-connected layers, classification layer) to keep the hyper-parameters or certain weighted-values fixed.

During the optional enrollment operational phase, an enrollee, such as a customer or registered user of the call center system 110, provides several speech examples to the call analytics system 101. For example, the enrollee could respond to various interactive voice response (IVR) prompts of IVR software executed by a call center server 111. The call center server 111 then forwards the recorded responses containing bona fide enrollment audio signals to the analytics server 102. The analytics server 102 applies the trained ML architecture to each of the enrollee audio samples and generates corresponding enrollee feature vectors (sometimes called "enrollee embeddings"), though the analytics server 102 disables certain layers, such as layers employed for training the fraud detection engine. The analytics server 102 generates an average or otherwise algorithmically combines the enrollee feature vectors and stores the enrollee feature vectors into the analytics database 104 or the call center database 112.

Layers of the fraud detection engine's ML architecture are trained to operate as one or more embedding extractors that generate the feature vectors representing certain types of embeddings. The embedding extractors generate the enrollee embeddings during the enrollment phase, and generate inbound embeddings (sometimes called "test embeddings") during the deployment phase. The embeddings include a spoof detection embedding (spoofprint) and a speaker recognition embedding (voiceprint). As an example, the fraud detection engine's architecture generates an enrollee spoofprint and an enrollee voiceprint during the enrollment phase, and generates an inbound spoofprint and an inbound voiceprint during the deployment phase.

During the deployment phase of the fraud detection engine, the analytics server 102 receives the inbound call data of the inbound phone call, as originated from the caller device 114 of an inbound caller. The analytics server 102 executes the fraud detection engine and fraud importance engine, by applying the ML architecture on the inbound call to extract the various types of features from the call audio and metadata to generate fraud risk scores for detecting fraud, where the fraud risk score indicates a likelihood of fraud.

The fraud detection engine generates one or more scores by applying multiple models for evaluating different anti-fraud or authentication measures, based upon measuring the certain features of the call data against voiceprints for speaker similarity scores, deviceprints for device similarity scores, and spoofprints for spoofing likelihood scores, among others. The fraud detection engine can algorithmically combine these respective scores generated from the various models to generate a combined threat risk score. In some implementations, the fraud detection engine executes one or more ensemble model techniques using a plurality of potential machine-learning algorithms available to the fraud detection engine, where the ensemble model is based upon the constituent machine-learning algorithms.

Example embodiments of the fraud detection engine and the machine-learning software and functions are described in U.S. application Ser. No. 15/262,748, entitled "End-To-End Speaker Recognition Using Deep Neural Network"; U.S. application Ser. No. 15/910,387, entitled "Method and Apparatus for Detecting Spoofing Conditions"; U.S. application Ser. No. 17/155,851, entitled "Robust Spoofing Detection System Using Deep Residual Neural Networks"; U.S. application Ser. No. 17/192,464, entitled "Systems and Methods of Speaker-Independent Embedding for Identification and Verification from Audio"; and U.S. application Ser. No. 17/165,180, entitled "Cross-Channel Enrollment and Authentication of Voice Biometrics." Each listed application has been incorporated by reference in its entirety.

For certain calls, the fraud detection engine detects a fraud event from the call data, in response to determining that the one or more scores generated by the fraud detection engine satisfy corresponding thresholds. The analytics server 102 generates a fraud alert for the particular fraud event detected in the particular call. The fraud alert contains various data about the call and the fraud event. The fraud alert could be stored into the analytics database 104 or call center database 112 with database records of prior calls. In some cases, the analytics server 102 stores the fraud alerts into a fraud alert notification queue ("fraud alert queue"), hosted by the non-transitory media of the analytics server 102 or analytics database 104.

Fraud Alert Queue

The fraud alert queue stores the fraud alerts as notifications for transmission to the client devices (e.g., agent device 116, admin device 103). The fraud alert queue prioritizes the fraud alerts according to fraud importance scores. Alternatively, an agent UI of the agent device 116 displays the fraud alerts received from the analytics server 102. The agent UI organizes the fraud alerts according to the respective fraud importance scores for the fraud events.

Fraud Importance Engine

As mentioned, the analytics server 102 executes software defines the fraud importance engine. The fraud importance engine receives configuration inputs from the agent device 112 or admin device 103, where the configuration inputs indicates certain operational parameters, including attributes (e.g., types of frauds), attribute values (e.g., "phishing," "ATO"), and corresponding weights. The system users define attributes for calculating the fraud importance score ($W_i$) each fraud event (i) detected by the fraud detection engine. The fraud importance engine accounts for the relative criticality of each aspect (e.g., types of fraud, fraud activities or cross-channel fraud activity, authentication results (or penetration level into authentication systems), account related information, spoofing results (or spoofing-related information), fraudster identities) of fraud events based on the comparative importance to the enterprise. The fraud importance engine also considers temporal aspects of fraud events. The fraud importance engine determines or receives a single normalized value of fraud importance weight (or score) in the range [0, 1] for the fraud event. The analytics server 102 (or other device of the system 100) uses the fraud importance score in various processes, including: model training; model selection; optimum weight selection for models; calculating performance metrics to, for example, maximize the WTPR at a given WFPR in the fraud detection engine; and prioritizing the fraud alert queue.

The configuration parameters of the fraud importance engine generally reflect the relatively critical aspects of calls, often considered fraud indicators for the particular enterprise. The parameters include the attribute fields (sometimes referred simply as "attributes"), attribute values, and corresponding weights. Although the attribute fields are selectable and customizable by the enterprise via the UI of the client devices 103, 116, the fraud importance engine typically includes the attributes of damages (e.g., risked exposure, actual loss), false negatives, and age-based importance (e.g., time-lapse decay). The attribute fields generally correspond to the types of information received in or derived from the call data. For instance, the call data includes speaker-independent characteristics (e.g., codec, DTMF tones, header data, transmission paths) that the analytics server 102 references to determine certain information about the caller device 114, such as the type of caller device 114, the location of the caller device 114, the cellular carrier 114, or the software executed by the caller device 114. Additionally or alternatively, the analytics server 102 executes the one or more ML models of the fraud detection engine to generate various fraud risk scores corresponding to attributes, such as speaker verification or authentication results, spoofing detection results, and the like.

The fraud importance engine need not have all attribute values when calculating the fraud importance score. The fraud importance engine could calculate the fraud importance score at any point when any number of attributes or attribute values associated with a fraud event is available to the analytics server 102. The fraud importance engine could calculate the fraud importance score based on current fraud importance scores inputted as configuration parameters for given fraud events. In some cases, the fraud importance engine is reconfigured at any time according to configuration inputs received via a configuration UI or API from another device. Accordingly, the fraud importance engine recalculates the fraud importance score for the given fraud event according to the new configuration inputs. Similarly, if the attribute value or attribute weight changes, the fraud importance engine recalculates the fraud importance score for one or more fraud.

Analytics Database

The analytics database 104 and/or the call center database 112 may be hosted on any computing device (e.g., server, desktop computer) comprising hardware and software components capable of performing the various processes and tasks described herein, such as non-transitory machine-readable storage media and database management software (DBMS). The analytics database 104 and/or the call center database 112 contains any number of corpora of training call data (e.g., training audio signals, training metadata) that are accessible to the analytics server 102 via the one or more networks. In some embodiments, the analytics server 102 employs supervised training to train the ML models of the ML architecture, where the analytics database 104 and/or the call center database 112 contains labels associated with the training call data or enrollment call data. The labels indicate, for example, the expected data for the training call data or enrollment call data. The analytics server 102 may also query an external database (not shown) to access a third-party corpus of training call data. An administrator may configure the analytics server 102 to select the training call data having various types of speaker-independent characteristics or metadata. The analytics database 104 stores the configuration inputs received from the agent device 116 that configure operational parameters of the fraud importance engine, as well as trained models, caller enrollment and registration information, and other types of information managing the functions of the analytics server 102.

Call Center Server

The call center server 111 of a call center system 110 executes software processes for managing a call queue and/or routing calls made to the call center system 110, which may include routing calls to the appropriate call center agent devices 116 based on the inbound caller's comments, instructions, IVR inputs, or other inputs submitted during the inbound call. The call center server 111 can capture, query, or generate various types of call data (e.g., audio data, audio recording, speaker-independent characteristics, metadata, speaker inputs) about the call, the caller, and/or the caller device 114 and forward the call data to the agent device 116, where an agent UI of the agent device 116 displays the call data to the call center agent.

The call center server 111 also transmits the call data to the call analytics system 101 to preform the various analytics processes on the call data of the inbound call or any prior call. The call center server 111 may transmit the call data to the analytics server 102 based upon a preconfigured triggering conditions (e.g., receiving the inbound phone call), instructions, or queries received from another device of the system 100 (e.g., agent device 116, admin device 103, analytics server 102), or as part of a batch transmitted at a regular interval or predetermined time.

Admin Device

The admin device 103 of the analytics system 101 is a computing device allowing personnel of the analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the analytics system 101 or provider system 110 and to issue queries and instructions to such components. In the example system 100, the agent device 116 configures the operations of the fraud importance engine and provides fraud detection feedback, though in some implementations, the admin device 103 performs one or more of these functions.

Agent Device

The agent device 116 of the call center system 110 may allow agents or other users of the call center system 110 to configure operations of devices of the call center system 110. For calls made to the call center system 110, the agent device 116 receives and displays via the agent UI some or all of the information associated with inbound call data, routed from the call center server 111 or from the analytics server 102. The agent UI further permits the agent to provide fraud detection feedback to the analytics server and configure the operations of the fraud importance engine by selecting or customizing the attributes for determining the fraud importance scores.

When performing a fraud detection operation, the agent UI presents the agent a list of fraud determinations for current or prior calls. The agent inputs whether the particular call involved fraud, which sometimes contradict and correct a previous determination made by the fraud detection engine. The analytics server 102 uses this feedback for retraining or tuning the ML models of the fraud detection engine, but also for tuning the fraud importance engine. For example, the feedback may disrupt the false negative and true positive ratios. The agent might accept the updated ratios or adjust the weight assigned to the false negative attribute field, thereby tuning the sensitivity of the fraud detection engine. The fraud importance engine could be adjusted to decrease the number of false negatives (overlooked instances of fraud), thereby generally increasing the fraud importance scores assigned to the call data, making it more likely that the fraud risk scores generated by the models of the fraud detection engine will satisfy the fraud detection thresholds.

Figure 2:
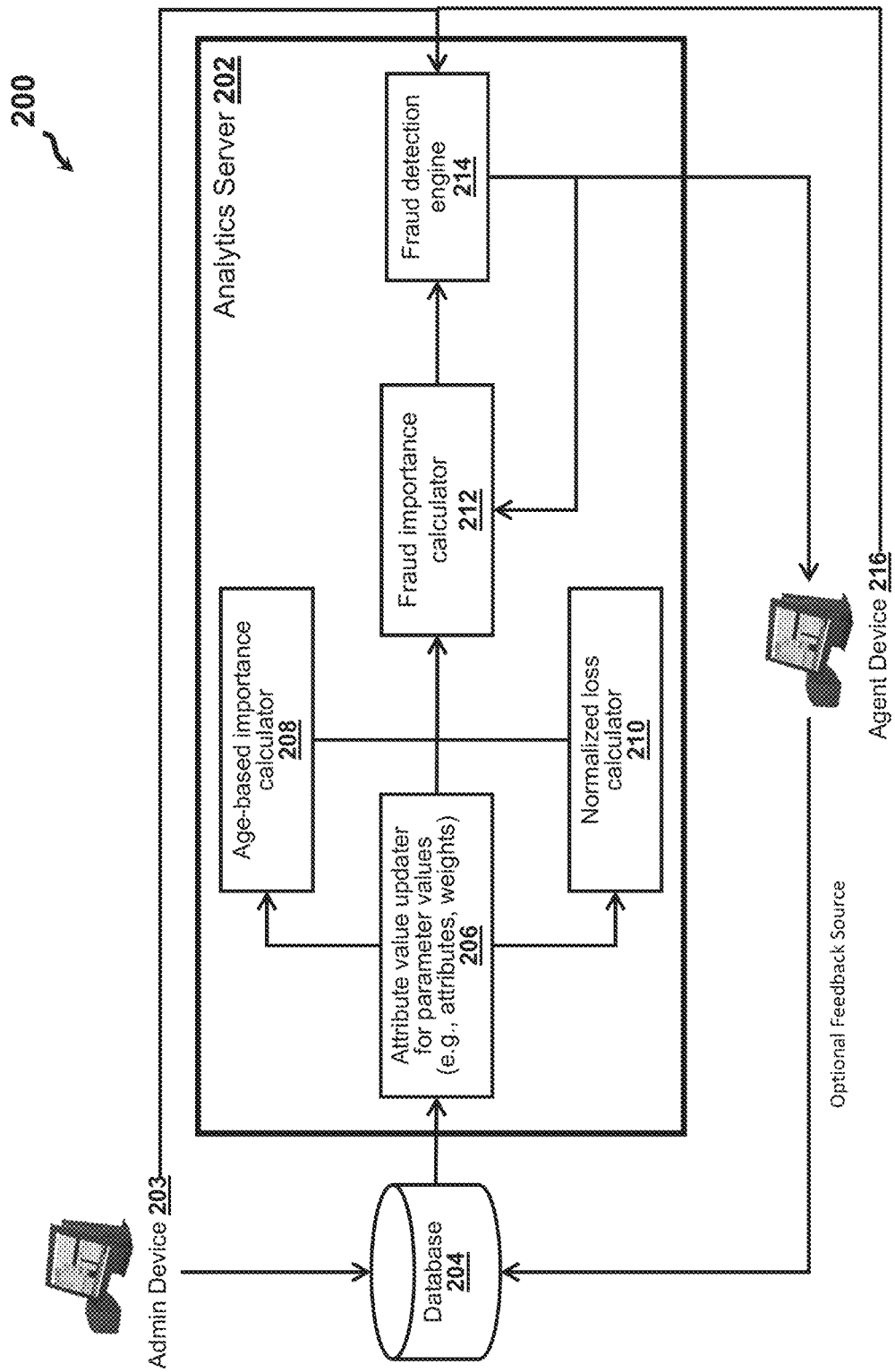
FIG. 2 shows the data flow among various components of a system, according to an embodiment.

FIG. 2 shows the data flow among various components of a system 200. The system 200 comprises an analytics server 202, admin device 203, database 204, and agent device 216. The analytics server 202 executes various software program operations, including machine-readable code and instructions that function as a fraud importance engine and fraud detection engine 214. The fraud importance engine includes functions including an attribute value updater 206, an age-based importance calculator 208, a normalized loss calculator 210, and a fraud importance calculator 212.

The admin device 203 performs various operations according to configuration UI inputs from an admin user. The configuration UI receives configuration inputs, entered by the admin user, to configure analytics operations of computing devices (e.g., analytics server 202) of the system 200. The configuration inputs include, for example, parameter inputs that indicate the operational attributes used by the analytics server 202 when executing a fraud detection engine and applying a ML architecture on call data. Non-limiting examples of the attributes include the various types of attributes, the values of the attributes, the weights of the attributes, and rankings of attribute values. The admin device 203 receives the configuration inputs from the admin user via the configuration UI, which the admin device 203 transmits to the database 204 or analytics server 202.

The database 204 stores the various attributes, which the database 204 receives as manual inputs from the admin device 203 or agent device 216 via the configuration UI. Additionally or alternatively, the database 204 receives certain attributes programmatically generated and forwarded by a device of the system 200 (e.g., analytics server 202, admin device 203, agent device 216).

The fraud events detected by the fraud detection engine are reviewed for accuracy, and a computing device generates a list of feedback corresponding to the detected fraud events, indicating whether each fraud event is, for example, a false negative, when the fraud event was undetected but should have been detected. The false negatives can be employed to generate or update a fraud importance score, which is then used to, for example, update or retrain the ML models of the fraud detection engine. In some implementations, a client device 203, 216 receives a listing of fraud detection results (e.g., determinations whether the fraud risk score of inbound contact data satisfies a risk threshold), including instances of both inbound contacts deemed fraudulent or not fraudulent by the fraud detection engine 214. The analytics server 204 or other device of the system 200 generates this listing of fraud detection determinations at regular preconfigured intervals or in response to query instructions received from the client device 203, 216. The user enters, via a feedback UI, feedback indicators for each entry, indicating whether the particular contact event was accurately deemed fraudulent or not fraudulent. The client device 203, 216 transmits this feedback data to the database 204 and/or the analytics server 202. The fraud importance calculator 212 uses the feedback data, for example, to update the performance metrics data and for re-training the ML models of the fraud detection engine 214. In some implementations, the fraud detection engine 214 and/or the fraud importance calculator 212 receive the fraud detection feedback that is generated automatically by other software functions.

Optionally Ingesting and Converting Weights

In some embodiments, the server 202 executes an attribute value updater 206, which comprises any number of source code functions instructing the server 202 to ingest attributes from the database 204. The attribute value updater 206 queries the database 204 to fetch the attributes used by the analytics server 202 to perform the various fraud importance and fraud detection operations. Each attribute is associated with an attribute value, which the analytics server 202 ingests as, or converts to, a weight, coefficient, or ranking. In some cases, the attribute value updater 206 converts the attribute values of certain types of attributes to weights in the domain range [0, 1]. For example, if particular attribute values represent rankings, rather than weights, then the attribute value updater 206 converts the rankings into normalized weights between [0, 1]. As another example, if particular attribute values represent coefficients, rather than normalized weights, then the attribute value updater 206 converts the coefficients into normalized weights between [0, 1].

For instance, the user inputs a configuration parameter indicating a ranking value for the weight of the particular attribute value, rather than a weight or coefficient. The attribute value updater 206 of the fraud importance engine converts the ranking values to weights values bounded to range [0, 1]. In some implementations, the attribute value updater 206 executes a simple linear transformation to translate the rankings into weights in the range [0, 1]. In some implementations, the attribute value updater 206 executes a non-linear transformation to translate the rankings into weights in the range [0, 1].

Age-Based Importance Calculator

The age-based importance calculator 208 of the fraud importance engine, executed by the server 202, includes any number of source code functions instructing the analytics server 202 to calculate an age-based importance value based upon attribute data retrieved from the database 204 and the call data indicating the timing of the fraud event.

The user configures the age-based importance calculator 208 to generate fraud importance scores in a way that prioritizes fraud events in terms of time. For example, the age-based importance calculator 208 generates higher fraud importance scores to comparatively more recent fraud events over comparatively older fraud events, which helps users to identify or instructs the fraud detection engine to prioritize comparatively newer fraud events. In some implementations, the age-based importance calculator 208 calculates a time decay factor ($\alpha$) using an exponential decay function that takes inputs such as the weight ($W_i$) (sometimes referred to as the fraud importance score) and age in terms of days (d), months (m), years (y), or other time measurement for a given fraud event (i). A time offset ($t_i^{off}$) is calculated from the current time ($t_i$) for each fraud event. To calculate the age-based importance score ($A^{age}$), the time decay factor is multiplied with the time offset of the fraud event. The age-based importance score is multiplied with the weight assigned to age attribute ($W_i^{age}$), which contributes to final fraud importance. In some implementations, the age-based importance calculator 208 (or other executable code of the server) executes a linear transformation or non-linear transformation operation configured to convert time-delta information in the inbound data to an age-based importance score, which, in turn, is used by the server to the calculate the fraud importance score.

Normalized Loss Calculator

The normalized loss calculator 210 of the fraud importance engine, executed by the server 202, includes any number of source code functions instructing the server 202 to calculate the normalized loss value, which represents, for example, the damages (e.g., monetary loss, risk exposure) resulting from a fraud event.

The normalized loss calculator 210 measures the damages (e.g., monetary losses, risk exposures) in terms of amount of currency (e.g., dollars, euros). Because the damages amounts ($L_i$) could have a wide range across fraud events (i), the normalized loss calculator 210 normalizes the loss or exposure amount ($L_i^{normalized}$) for each fraud event to the range [0, 1]. The normalization can be done by dividing each damages amount (e.g., loss amount, exposure amount) by a maximum damage amount ($L^{max}$). Other normalization techniques could be used, though the damages amounts ($L_i$) should be normalized to the range [0, 1]. The normalized damage value ($L_i^{normalized}$) is multiplied by a weight ($W^{loss}$) that contributes to final fraud importance score.

Fraud Importance Calculator

The fraud importance calculator 212 of the fraud importance engine, executed by the server 202, includes any number of source code functions instructing the server 202 to calculate a fraud importance value. The fraud importance calculator 212 takes as input the various attributes (e.g., types of attributes, attribute values, weights) from the database 204, the age-based importance value outputted by the age-based importance calculator 208, and the normalized loss value outputted by the normalized loss calculator 210. Based on these inputs, the fraud importance calculator 212 instructs the server 202 to calculate the fraud importance score for each fraud event. The fraud importance score becomes an input to one or more ML models of the fraud detection engine 214.

In some embodiments, the fraud importance calculator 212 calculates the fraud importance score using a noisy-OR expression. The noisy-OR expression gives flexibility and interpretability to the end user. The noisy-OR is also capable of dealing with missing values. As all inputs to fraud importance have a value in range [0, 1], the resulting fraud importance value is bounded between [0, 1] range.

Fraud Detection Engine

The fraud detection engine 214, executed by the server 202, includes any number of source code functions instructing the server 202 to apply the ML architecture to the call data and the fraud importance score to generate one or more risk scores that represent the likelihood of fraud for a given telephone call or fraud event or an event or aspect of the telephone call. The fraud detection engine 214 applies various ML models or executes handcrafted algorithms to generate the risk scores. In operation, the server 202 detects fraud in the inbound call or prior call when the fraud detection engine 214 determines that a risk score satisfies a risk threshold score.

Fraud Importance Score Fed to Fraud Detection Engine's ML Architecture

Figure 3:
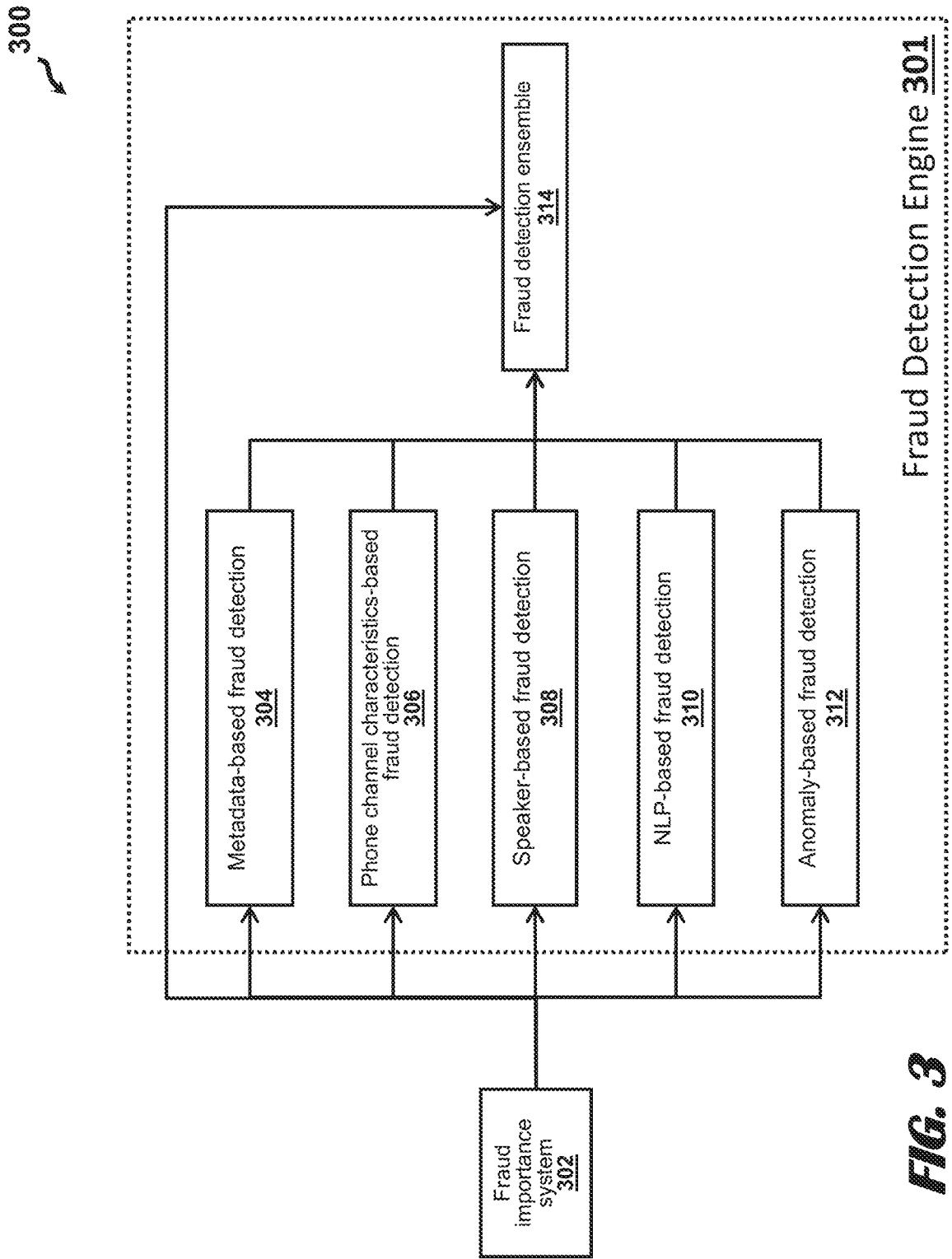
FIG. 3 is a diagram showing data flow among components or sub-components of software processes executed by a server.

FIG. 3 is a diagram showing data flow among components or sub-components of software processes executed by a server 300, including a fraud detection engine 301 and a fraud importance system 302. The fraud detection engine 301 comprises subcomponents that target specific categories of fraud risk and corresponding risk factors. These risk factors contribute to a final detection ensemble 314 calculation of the fraud detection engine 301. The various sub-components of the fraud detection engine 301 comprise ML models trained to process certain types of call data (e.g., audio data, speaker-independent characteristics, conversation content, metadata) associated with phone calls to enterprise call centers. As shown in FIG. 3, non-limiting examples of sub-components of the fraud detection engine 301 include a metadata-based fraud detection sub-component (metadata engine 304), a phone channel characteristics-based fraud detection sub-component (channel engine 306), a speaker-based fraud detection sub-component (speaker-evaluation engine 308), a natural language processing (NLP) fraud detection sub-component (NLP engine 310), anomaly-based fraud detection sub-component (anomaly detection engine 312), and a fraud detection ensemble sub-component (fraud detection ensemble 314), among others.

The metadata engine 304 comprises a ML model trained to determine a likelihood of fraud based upon the metadata received in the call data (e.g., phone number/ANI, carrier, area code, country code).

The channel engine 306 comprises a ML model trained to determine a likelihood of fraud based upon the similarities between expected and observed noise profiles or channel characteristics of the audio.

The speaker-evaluation engine 308 comprises a ML model trained to determine a likelihood of fraud based upon similarities between expected and observed speaker voiceprint.

The NLP engine 310 generates, receives, or otherwise obtains a word processing or text file containing a text transcription of the conversation and identifies certain contextual features about the conversation, such as intent or caller activities. The NLP 310 comprises a ML model trained to determine a likelihood of fraud based upon the contextual features about the conversation between the caller and agent.

The anomaly detection engine 312 comprises a ML model trained to determine a likelihood of fraud based upon a particular anomaly detection ML algorithm (e.g., k-nearest neighbor, Hidden Markov Models (HMMs), cluster analysis outlier detection), configured to detect anomalies (outliers) in one or more types of call data relative to expected call data.

The fraud detection ensemble 314 can take fraud importance as an input and optimize the metrics such as weighted TPR at given weighted FPR. The fraud detection ensemble 314 includes any number of ensemble techniques, such as logistic regression and tree-based functions (e.g., random forest, AdaBoost, XGBoost). The fraud detection ensemble 314 incorporates one or more constituent ML models to generate a combine risk score.

Fraud Importance Score Fed to Downstream Fraud Detection Processes

Figure 4:
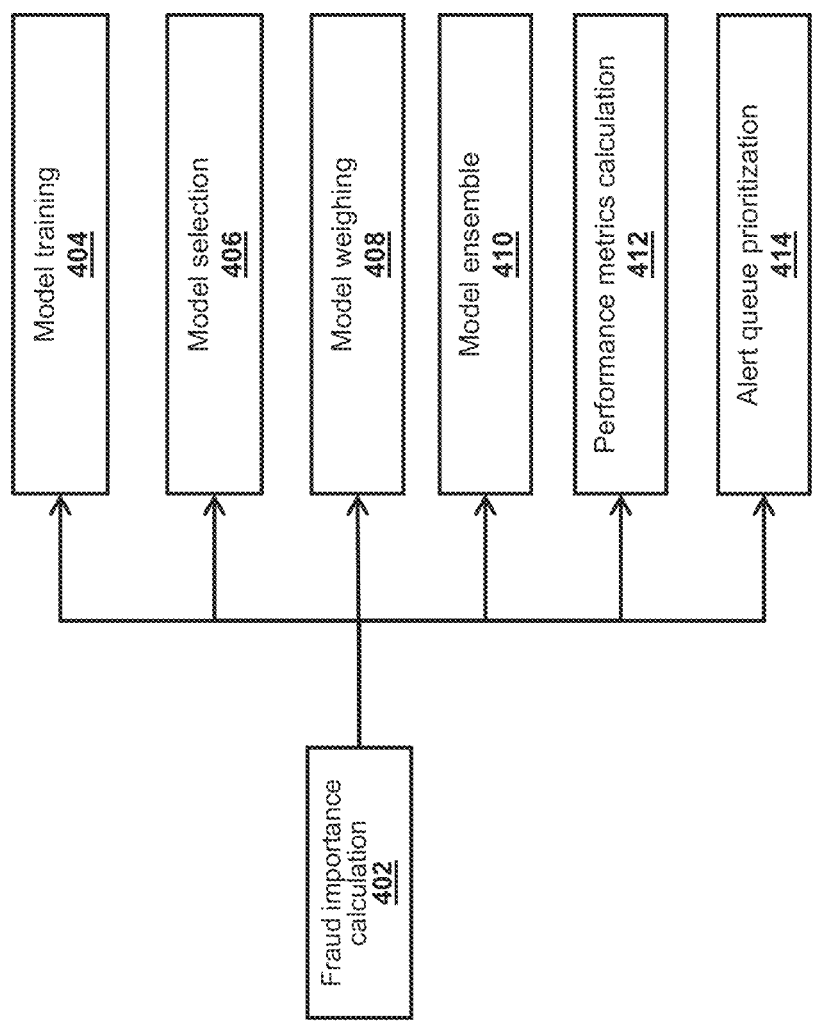
FIG. 4 is a diagram showing data flow between operational processes executed by a server.

FIG. 4 is a diagram showing data flow between operational processes executed by a server 400, indicating non-limiting examples of downstream processes that employ a fraud importance score. The processes include, for example, a fraud importance calculation 402, model training 404, model selection 406, model weighing 408, model ensemble 410, performance metrics calculation 412, and alert queue prioritization 414.

The fraud importance calculation 402 process generates the fraud importance score according to inputs that the server 400 receives from a client device (e.g., agent device, admin device) via a GUI. The inputs include, for example, configuration inputs, parameter inputs, and fraud detection feedback.

The model training 404 process trains or re-trains the ML models of the ML architecture. The server applies the ML architecture of the fraud detection engine to training call data comprising various types of labeled call data (e.g., metadata, audio data, speaker-independent data). The fraud importance engine generates one or more fraud importance scores that inform the model training 404 processes for the fraud detection engine's ML models. The call data processed by the analytics server 102 could include training data, enrollment data, or inbound call data (processed during the deployment phase). The analytics server 102 applies the various ML models of the ML architecture on the training call data and adjusts the hyper-parameters according to one or more loss functions until the hyper-parameters are fixed. The fraud importance engine generates the one or more fraud importance scores for the labeled fraud events of the training call data. During training, the fraud importance scores cause the fraud detection engine to increase or decrease the weights and hyper-parameters of the ML model for detecting the type of fraud for the fraud event in the training data. In some implementations, the model training 404 process determines whether to exclude the call data of fraud calls from the model training 404 process, where the fraud calls receive a fraud importance score below a certain threshold value required by or otherwise associated with the model training 404 process.

The model selection 406 process uses the fraud importance score to select one or more ML models to ensure the models associated with the types of fraud events of the training call data or other call data. Additionally, or alternatively, the model selection 406 process use the fraud importance score to select the ML models configured for detecting fraud events having a comparatively higher fraud importance over the ML models associated with fraud events having comparatively lower fraud importance.

Similarly, the model weighing 408 process uses the fraud importance scores to weigh and determine the ML models that are comparatively more pertinent to the types of fraud events indicated by the configuration parameters. For instance, the ML models associated with the fraud events having comparatively higher fraud importance are assigned higher weights than the ML models associated with fraud events having comparatively lower fraud importance.

The model ensemble 410 process uses the fraud importance scores as an input to multi-model function that generates a combined risk score, or to update the weights of the fraud detection engine or fraud importance engine to optimize the performance metrics (e.g., WTPR at given % of WFPR). The fraud detection ensemble includes any number of ensemble techniques, such as logistic regression and tree-based functions (e.g., random forest, AdaBoost, XGBoost). The fraud detection ensemble incorporates one or more constituent ML models to generate a combined risk score The performance metrics calculation 412 process calculates the performance metrics of the fraud detection engine or fraud importance engine to evaluate and adjust the operations to achieve an optimal detection performance of the fraud events with high value of fraud importance as compared to those with lower value of fraud. The performance metrics calculation 412 process calculates, for example, a TPR, FPR, WTPR, and WFPR. The WTPR and WFPR are based upon weights or importance scores ($W_i$) associated with fraud events (i).

Embodiments of the fraud importance engine modify conventional metrics (e.g., TPR, FPR) generally used for performance measurement and optimization of fraud detection engines, such that these conventional metrics are modified to account for and develop the fraud importance score. During execution, the performance calculation 412 process determines the performance metrics based on the prior and/or current results of the fraud detection engine and feedback received from users. Using the outputs of the fraud detection engine (e.g., determinations whether the fraud risk score of inbound contacts satisfy a risk threshold score) and the feedback, the performance metrics calculation 412 process calculates the modified performance metrics, such as the WTPR and WFPR, used by the fraud importance engine to generate the fraud importance score, among other downstream processes (e.g., model training 404). The performance metrics calculation 412 process is not limited to the metrics mentioned above, and might include any metric computed based upon TP, FP, and FN that could be modified to use to determine the fraud importance score. Non-limiting examples of the metrics calculated by the performance metrics calculation 412 process include TP, FP, FN, TN, TPR, FPR, FNR, WTPR, WFPR, weighted FRN (WFNR), precision, and recall.

The alert queue prioritization 414 process organizes or sorts the presentation or transmission of fraud alerts for fraud events according to the relative fraud importance scores assigned to the fraud events. In some cases, the fraud alert queue prioritizes transmission of fraud alerts having a comparatively higher importance score for a given batch of notifications transmitted over one or more networks to the agent devices. Alternatively, an agent UI of the agent device displays the fraud alerts or fraud events as organized by the alert queue prioritization 414 process according to the respective fraud importance scores.

ADDITIONAL EXAMPLE EMBODIMENTS

Figure 5:
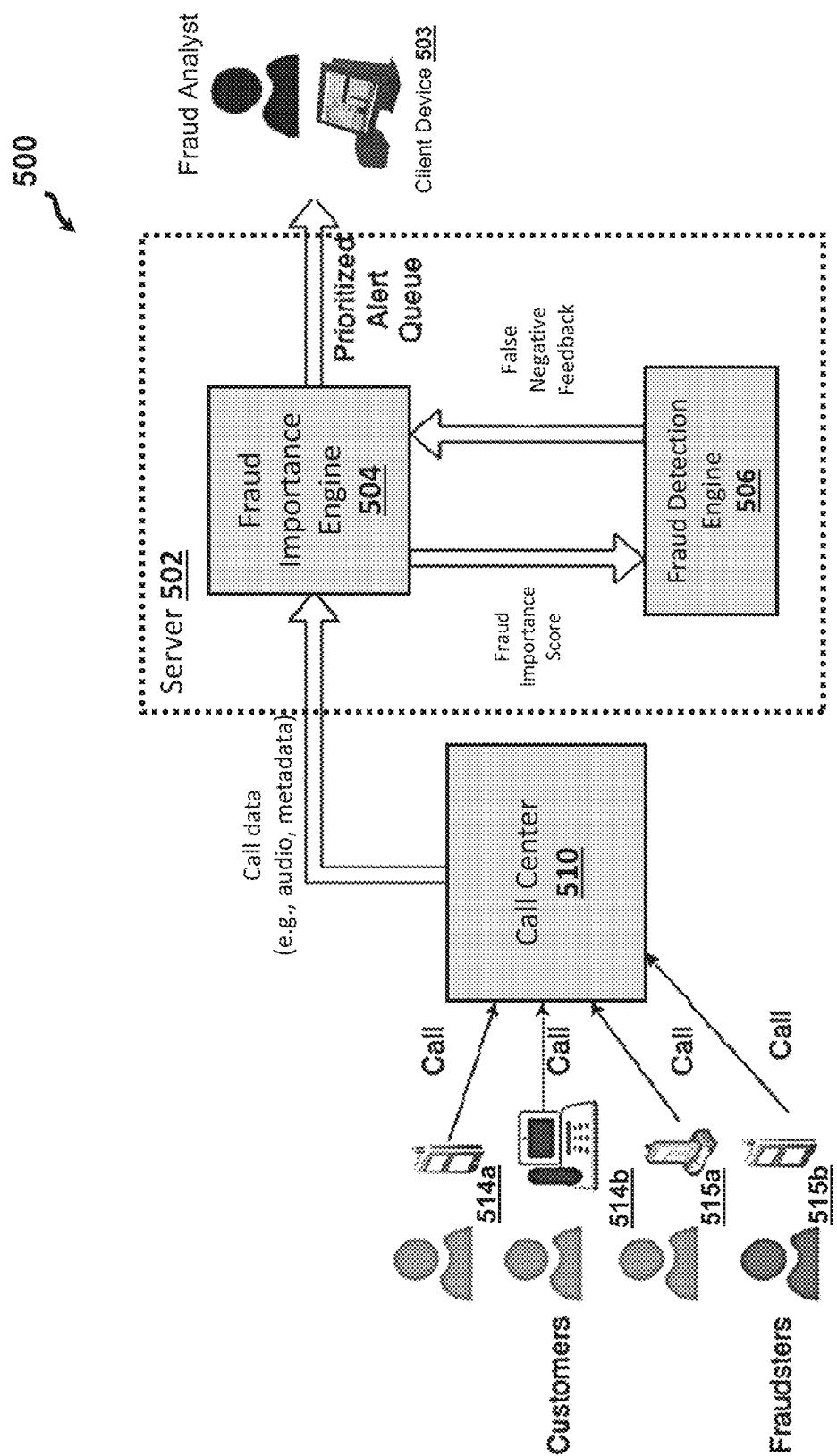
FIG. 5 shows data flow among components of a system implementing a fraud importance engine and fraud detection engine to monitor and detect fraud of an enterprise call center.

FIG. 5 shows data flow among components of a system 500 implementing a fraud importance engine 504 and fraud detection engine 506 to monitor and detect fraud of an enterprise call center 510. The system 500 includes caller devices 514a-b, 515a-b (referred to as caller devices 514, 515), operated by callers to contact the call center 510. The callers include either genuine enterprise customer or fraudsters. The customers operate customer devices 514a, 514b (referred to as "customer devices 514"), and the fraudsters operate fraudster devices 515a, 515b (referred to as "fraudster devices 515"). The system 500 further includes a server 502 and a client device 503.

Customers operate the customer devices 514 to place calls to the enterprise call center 510 to access different services offered by the enterprise over various phone channels (e.g., landline, cellular, VoIP). Fraudsters also operate the fraudster devices 515 to call the call center 510 to practice various fraud activities, such as pretending to be genuine customers to commit fraud. One or more computing systems of the call center 510 receive call data (e.g., audio data, metadata) from the inbound calls and transmit the call data to the server 502 to perform various fraud analytics operations for the call center 510.

The server 502 executes any number of software programs for performing the fraud analytics operations, including machine-executable software code performing operations of a fraud detection engine 506 and a fraud importance engine 504. The fraud detection engine 506 includes machine-learning algorithms that ingest the call data received from the call center 510 to identify and evaluate various fraud indicators and detect calls associated with fraud (fraud events).

A user operates the client device 503 to configure the fraud detection engine 506 by entering configuration or attribute inputs. The user is a fraud analyst or administrator of the enterprise or a third-party analytics service. The attributes inputs indicate, for example, attributes, attribute values, and weights or ranking for the attributes or attribute values. The fraud detection engine 506 ingests the call data for each fraud event and generates a fraud importance score for the particular fraud event.

The fraud detection engine 506 uses the fraud importance score in various processes, including model training, model selection, optimizing weights of the models, performing a model ensemble process, calculating performance metrics, and prioritizing fraud alerts in an alert queue. As an example, the server 502 transmits fraud alerts to a UI of the client device 503 or another computing device of the system 500 according to the prioritization of the alert queue.

As another example, the fraud importance engine 504 or the client device 503 submits false negative feedback to the fraud detection engine 506 or the fraud importance engine 504 for certain downstream operations. The false negatives indicate fraud events undetected by the ML models of the fraud detection engine. The fraud importance engine 504 and the fraud detection engine 506 uses the false negative feedback to improve the performance of the fraud detection engine 506 and calculate the fraud importance scores. The user enters an attribute weight for the false negative attribute, which the fraud importance engine 504 assigns to the false negative (undetected) fraud events for calculating the fraud importance scores.

In some implementations, the server 502 or another computing device of the system 500 executes a mitigation operation in response to detecting fraud events satisfying a fraud importance score threshold. For example, server 502 rejects further data traffic or terminates the inbound call, automatically contacts an administrator or the authorities, or performs further authentication operations.

Figure 6:
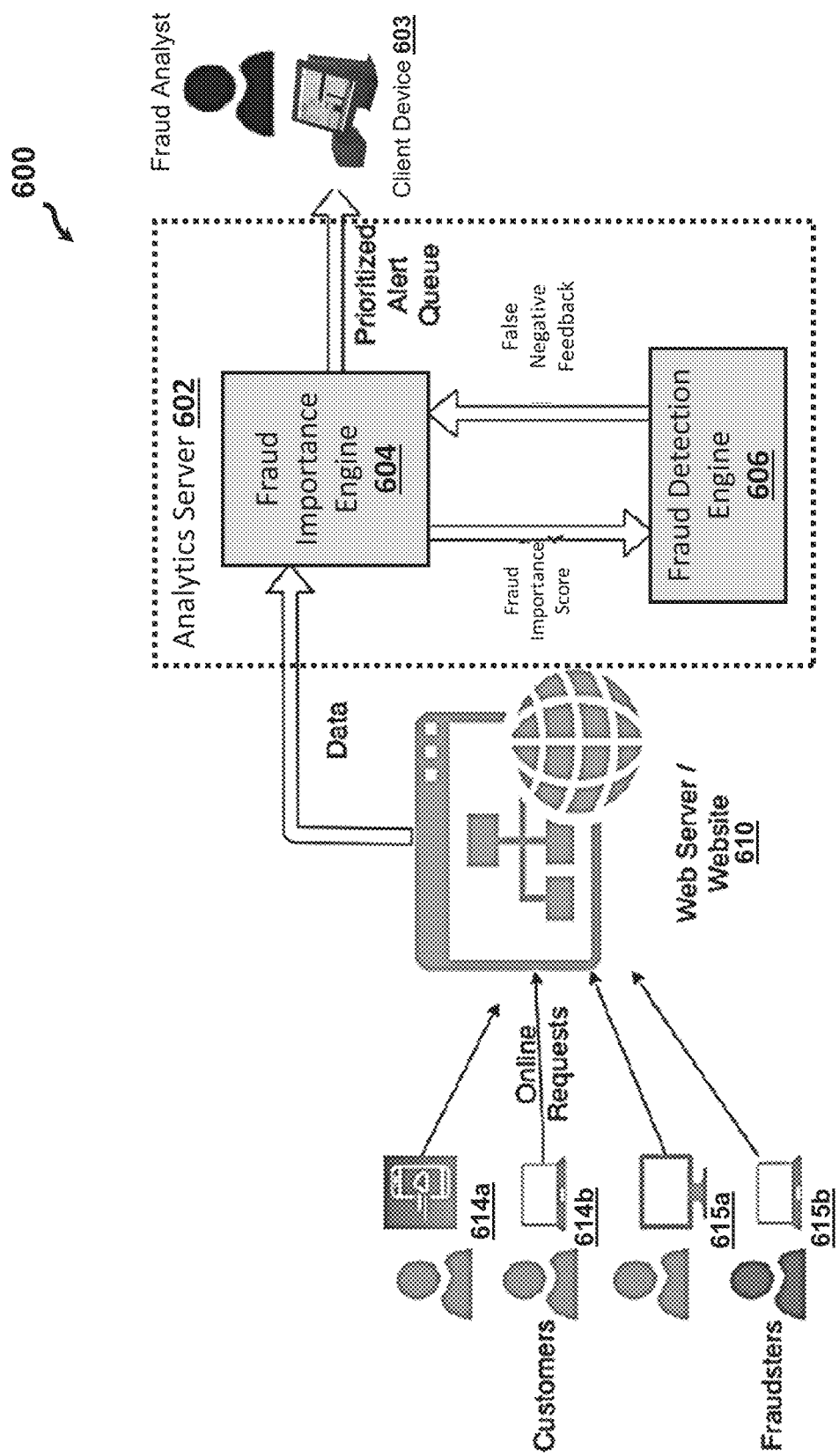
FIG. 6 shows data flow among components of a system implementing a fraud importance engine deployed to monitor and detect fraud of an online channel of an enterprise.

FIG. 6 shows data flow among components of a system 600 implementing a fraud importance engine deployed to monitor and detect fraud of an online channel of an enterprise. The enterprise offers various Internet-based channels to service customers online (e.g., websites, mobile apps). The system 600 includes end-user devices 614a-b, 615a-b (referred to as end-user devices 614, 615), operated by end-user accessing an enterprise's website hosted by a web server 610 of the enterprise network. The end-users include either genuine enterprise customers or fraudsters. The customers operate customer devices 614a, 614b (referred to as "customer devices 614"), and the fraudsters operate fraudster devices 615a, 615b (referred to as "fraudster devices 615"). The system 600 further includes an analytics server 602 and a client device 603.

Operating the customer device 614, the customer typically logs in to a website or application to access the services via the web server 610. The customer device 614 transmits authentication information, such as username and password, and requests the services offered by the enterprise. The fraudster device 615 could access or intercept the username and password of the customer, allowing the fraudster to commit fraud on via the online channel.

The web server 610 receives various types of traffic data (e.g., user inputs, metadata) received in the requests received from the end-user devices 614, 615, and transmits the traffic data to the analytics server 602 to perform various fraud analytics operations for the online channel.

The analytics server 602 executes any number of software programs for performing the fraud analytics operations, including machine-executable software code performing operations of a fraud detection engine 606 and a fraud importance engine 604. The fraud detection engine 606 includes machine-learning algorithms that ingest the traffic data received from the webserver 610 to identify and evaluate various fraud indicators and identify network traffic associated with fraud (fraud events).

A user operates the client device 603 to configure the fraud detection engine 606 by entering configuration or attribute inputs. The user is a fraud analyst or administrator of the enterprise or a third-party analytics service. The attributes inputs indicate, for example, attributes, attribute values, and weights or ranking for the attributes or attribute values. The fraud detection engine 606 ingests the traffic data for each fraud event and generates a fraud importance score for the particular fraud event.

The fraud detection engine 606 uses the fraud importance score in various processes, including model training, model selection, optimizing weights of the models, performing a model ensemble process, calculating performance metrics, and prioritizing fraud alerts in an alert queue. As an example, the analytics server 602 transmits fraud alerts to a UI of the client device 603 or another computing device of the system 600 according to the prioritization of the alert queue.

As another example, the fraud importance engine 604 or the client device 603 submits false negative feedback to the fraud detection engine 604 or the fraud importance engine 604 for certain downstream operations. The false negatives indicate fraud events undetected by the ML models of the fraud detection engine. The fraud importance engine 604 and the fraud detection engine 606 uses the false negative feedback to improve the performance of the fraud detection engine 606 and calculate the fraud importance scores. The user enters an attribute weight for the false negative attribute, which the fraud importance engine 604 assigns to the false negative (undetected) fraud events for calculating the fraud importance scores.

In some implementations, the server 602 or another computing device of the system 500 executes a mitigation operation in response to detecting fraud events satisfying a fraud importance score threshold. For example, server 602 rejects further data traffic or terminates the inbound call, automatically contacts an administrator or the authorities, or performs further authentication operations.

FIGS. 7-10 show example screenshots for configuration UIs 700-1000 of an admin device or agent device for configuring operations of a fraud importance calculator. Each configuration UI 700-1000 includes GUI input elements (e.g., text boxes, buttons) that receive attributes from a user (e.g., admin user, agent user). The attributes include, for example, types of fraud, fraud activity for the type of fraud, cross-channel fraud activity, level of penetration into authentication system, account related information, fraudsters, spoofing-related information, and temporal information of the fraud events. The attributes also include weights, generated by a fraud detection engine or inputted manually by the user. For instance, the UIs 700-1000 permit the user to, for example, customize the attribute fields (e.g., fraud type, activity), select attribute values (e.g., "ATO," "wire transfer"), and assign weights. The weights fall into a normalized range [0, 1], which the user inputs directly or the server normalizes to the normalized range. Additionally or alternatively, the user inputs rankings as attribute values, rather than weights; the server normalizes the rankings to the normalized range. The user adjusts the various attribute fields and weights according to a type of business or business line of the particular enterprise and call center.

As mentioned, to calculate fraud importance scores for fraud events, the fraud importance engine obtains information about which attributes and attribute values are applicable for a given fraud event. This information can be obtained using either configuration UIs 700-1000 or agent UIs during a manual review process by fraud analysts or using API during automatic review process executed by a server.

Figure 7:
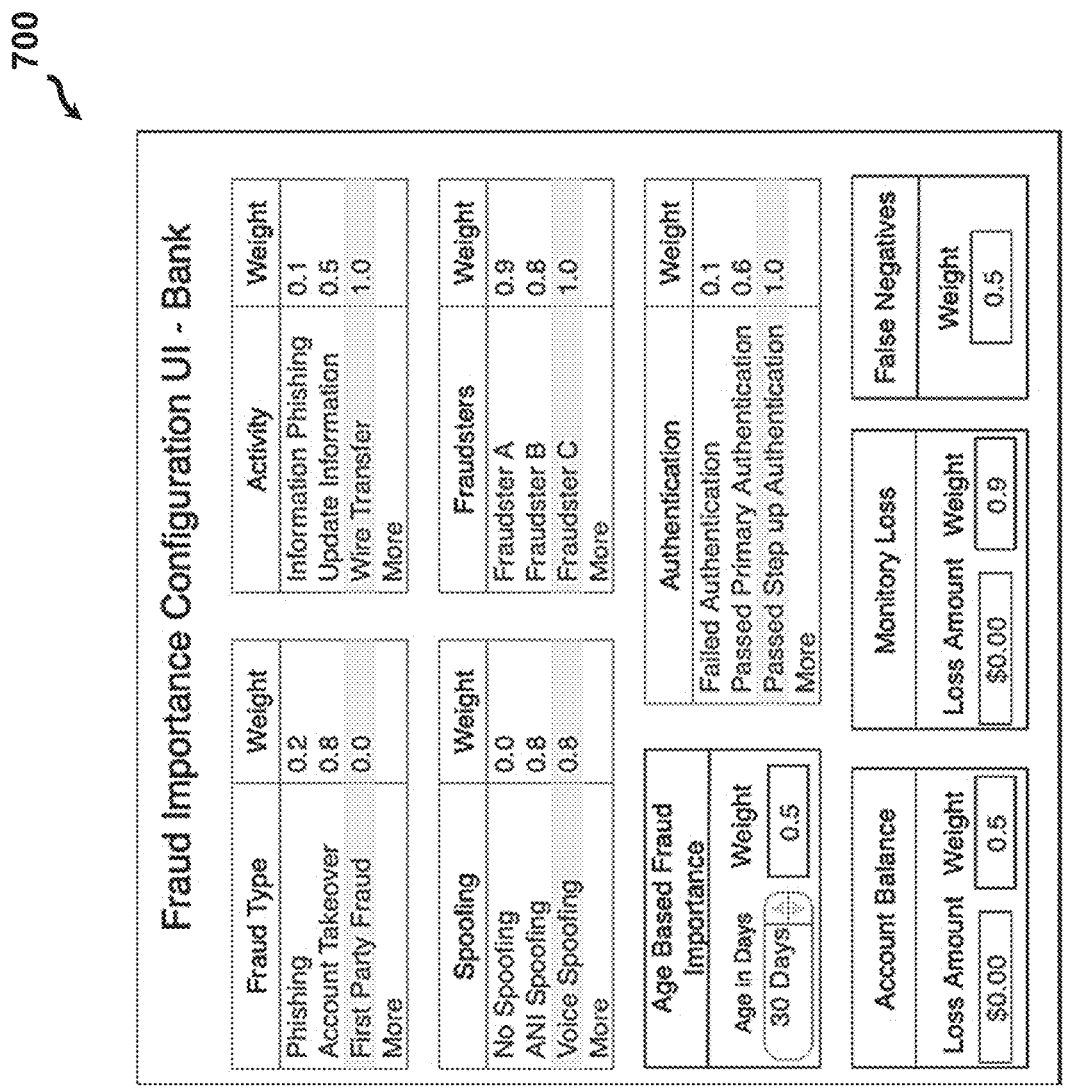
FIG. 7 shows the screenshot of a banking configuration UI (banking UI) for a banking business.

FIG. 7 shows the screenshot of a banking configuration UI (banking UI 700) for a banking business. The banking UI 700 includes attribute fields of:
  fraud-type ("Phishing," "ATO," "First Party Fraud");
  corresponding fraud activities ("Information Phishing," "Update Information," "Wire Transfer");
  spoofing detection results ("No Spoofing," "ANI Spoofing," "Voice Spoofing");
  fraudster identities ("Fraudster A," "Fraudster B," "Fraudster C");
  authentication results ("Failed Authorization," "Passed Primary Authentication," "Passed Stepped Up Authentication");
  age-based fraud importance attribute;
  account balance;
  monitory loss;
  false negatives; and
  weights associated with each of the various attribute fields.

In the example embodiment of FIG. 7, a bank or other financial institution (e.g., brokerage firm) deploys the fraud importance engine and fraud detection engine for monitoring fraud in a call center or an online channel. For the bank, attributes related to account information (e.g., balance on the account, the monetary loss, past transactions, recent activities on the account) are important. Other important attributes for the bank include type of fraud, fraud activity, level of penetration into authentication systems (e.g., authentication results), and the age of the fraud activity. The user configures and customizes the attribute fields, attribute values, and weights or ranking in the fraud importance engine, via the banking UI 700. The fraud importance engine generates the fraud importance score. Downstream, the fraud detection engine ingests and uses the fraud importance score to prioritize detected fraud events.

FIG. 8 shows the screenshot of a credit card configuration UI (card UI 800) for a credit card business. The card UI 800 includes attribute fields of:
  fraud-type ("Phishing," "ATO," "First Party Fraud");
  corresponding fraud activities ("Information Phishing," "Update Information," "Balance Transfer," "Travel Notice," "New Credit Card Order," "Adding Authorized Users");
  spoofing detection results ("No Spoofing," "ANI Spoofing," "Voice Spoofing");
  fraudster identities ("Fraudster A," "Fraudster B," "Fraudster C");
  authentication results ("Failed Authorization," "Passed Primary Authentication," "Passed Stepped Up Authentication");

credit card loss;
credit card balance;
age-based fraud importance attribute;
false negatives; and
weights associated with each of the various attribute fields.

In the example embodiment of FIG. 8, a credit lender (e.g., credit card providers, auto, home, business loan providers) deploys a fraud importance engine and fraud detection engine to monitor and detect fraud at a call center or an online channel. For the credit lender, fraud activities could differ from fraud activities experienced at banks, or the importance of fraud activities could be vary in importance. The fraud activities (e.g., addition of authorized users, balance transfer to other credit cards, ordering new credit cards) are high-risk activities in credit lending companies. The credit lenders typically vary or limit the amount of credit extended to a customer based upon credit factors, such as the credit score. As such, the credit limit can be another risk attribute, similar to monetary loss or exposure, because a higher credit limit corresponds to a higher exposure to fraud. The account based information (e.g., as age of the account, last activity on the account) can be used as an attribute to calculate the fraud importance.

FIG. 9 shows the screenshot of a retail configuration UI (retailer UI 900) for a retail business. The retailer UI 900 includes attribute fields of:
fraud-type ("Employee Fraud," "Discount Abuse," "Refund Fraud," "Wardrobing");
corresponding fraud activities ("Large Activities," "Expedite Shipping," "Change of Delivery Address");
spoofing detection results ("No Spoofing," "ANI Spoofing," "Voice Spoofing");
fraudster identities ("Fraudster A," "Fraudster B," "Fraudster C");
order amount;
age-based fraud importance attribute;
false negatives; and
weights associated with each of the various attribute fields.

In the example embodiment of FIG. 9, a retailer deploys a fraud importance engine and fraud detection engine to monitor and detect fraud at a call center or an online channel. The fraud activities and types of fraud critical to retailers frequently differ from other industries (e.g., banking, credit lending). For instance, the fraud-types typically include refund fraud, discount abuse, and wardrobing. Accordingly, the fraudsters' activities often include placing atypical or large purchase orders, expediting shipments of purchased merchandise, and changing a delivery address while merchandise is in transit. Operating the retailer UI 900, the user configures the fraud importance engine to prioritize detected fraud events according to criticality based upon the weights.

FIG. 10 shows the screenshot of an insurance configuration UI (insurer UI 1000) for an insurance business. The insurer UI 1000 includes attribute fields of:
fraud-type ("Misrepresentation," "First Party Fraud," "Third Party Fraud");
corresponding fraud activities ("False Insurance Claims," "Inflated Claims," "Inflated Claims," "False Natural Disaster Claims");
spoofing detection results ("No Spoofing," "ANI Spoofing," "Voice Spoofing");
fraudster identities ("Fraudster A," "Fraudster B," "Fraudster C");
type of insurance ("Life," "Health Care," "Automotive," "Home/Retail");
authentication results ("Failed," "Passed Primary Authentication," "Passed Stepped Up Authentication");
insurance claim amount;
insurance coverage;
monetary loss;
age-based fraud importance attribute;
account age;
false negatives; and
weights associated with each of the various attribute fields.

In the example embodiment of FIG. 1000, an insurance organization deploys a fraud importance engine and fraud detection engine to monitor and detect fraud at a call center or an online channel. The types of fraud, fraud activities, and relative criticality for detecting fraud, differ in the insurance industry against other industries. Likewise, the fraud-types, fraud activities, and relative criticalities, vary depending upon the type of insurance policy (e.g., life, health, auto, home, rental) targeted by a fraudster. As an example, fraud on a life insurance policy includes faking the death of an insured person or falsely claiming to be a dependent of a deceased insured person. In health care insurance fraud includes, for example, intentionally submitting false, deceptive, or misleading information about the health of an insured person. First party fraud includes, for example, when the insured person fails to declare a pre-existing condition. Other fraudulent activities include, for example, prescription drug fraud, altering enrollment forms, and failing to report other health care coverage. Third party fraudulent activities sometimes affect the healthcare insurance policy; examples include faking physician insurance claims, falsely billing for services not rendered to a patient, falsely billing for premium healthcare services. As another example, the auto insurance industry often experiences "staged collision" fraud or exaggerated claim on the auto policy. In homeowners or rental insurance policies, examples of fraudulent activities include false claims for damage, theft, or natural disasters. Operating the insurer UI 1000, the user configures the fraud importance engine to prioritize detected fraud events according to criticality based upon the weights.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a computer, one or more parameters comprising one or more attributes, one or more attribute values, and one or more attribute weights;
generating, by the computer, one or more risk scores for one or more types of fraud corresponding to the one or more attributes by applying a machine-learning architecture comprising one or more machine-learning models on contact data of one or more contacts;
identifying, by the computer, a plurality of fraud events in the one or more contacts, each fraud event associated with a risk score of a machine-learning model of the machine-learning architecture satisfying a risk threshold; and
for each fraud event,
generating, by the computer, a fraud importance score according to an attribute weight associated with an attribute and an attribute value of the one or more parameters corresponding to a type of fraud of the fraud event; and
generating, by the computer, a fraud alert in a fraud alert queue according to the fraud importance score.

2. The method according to claim 1, further comprising training, by the computer, the machine-learning model to determine the risk score corresponding to a particular type of fraud of an attribute value, by applying the machine-learning model on the contact data of one or more prior contacts and the fraud importance score of each fraud event in the one or more prior contacts.

3. The method according to claim 1, wherein generating the fraud importance score includes:
receiving, by the computer, from a client device fraud event feedback corresponding to each fraud event, the fraud event feedback containing one or more detection accuracy indicators; and
generating, by the computer, a false negative attribute value based upon the one or more detection accuracy indicators of the fraud event feedback, wherein the fraud importance score is generated based upon the false negative attribute value.

4. The method according to claim 1, wherein generating the fraud importance score includes:
generating, by the computer, an age-based attribute value based upon a timestamp in the contact data for the contact, wherein the fraud importance score is generated based upon the age-based attribute value.

5. The method according to claim 1, wherein generating the fraud importance score includes:
for the contact data of each contact of the one or more contacts:
generating, by the computer, a normalized weight as the attribute weight in accordance with the attribute and the attribute value, wherein the fraud importance score is generated based upon the normalized weight generated for the contact data of the particular contact.

6. The method according to claim 5, wherein generating the normalized weight includes:
converting, by the computer, the attribute weight representing a ranking for the attribute value to the normalized weight.

7. The method according to claim 1, wherein applying the machine-learning architecture includes:
selecting, by the computer, a machine-learning model corresponding to a type of fraud in accordance with an attribute, an attribute value, and an attribute weight, wherein the attribute value indicates the type of fraud and the attribute weight indicates the comparative importance for the attribute value.

8. The method according to claim 1, wherein the one or more attributes include at least one of: the type of fraud, a fraud activity, a cross-channel fraud activity, a penetration level associated with authentication, account information, fraudster identity, and spoofing information.

9. The method according to claim 8, wherein applying the machine-learning model includes:
extracting, by the computer, one or more features from the contact data of the contact for applying the machine-learning model selected by the computer.

10. The method according to claim 1, further comprising transmitting, by the computer, a fraud alert notification containing the fraud alert in the fraud alert queue to a client computer according to the fraud importance score.

11. A system comprising:
a database comprising non-transitory memory configured to store a plurality of machine-learning models of a machine-learning architecture; and
a server comprising a processor configured to:
receive one or more parameters comprising one or more attributes, one or more attribute values, and one or more attribute weights;
generate one or more risk scores for one or more types of fraud corresponding to the one or more attributes by applying the machine-learning architecture comprising the one or more machine-learning models on contact data of one or more contacts;
identify a plurality of fraud events in the one or more contacts, each fraud event associated with a risk score of a machine-learning model of the machine-learning architecture satisfying a risk threshold; and
for each fraud event:
generate a fraud importance score according to an attribute weight associated with an attribute and an attribute value of the one or more parameters corresponding to a type of fraud of the fraud event; and
generate a fraud alert in a fraud alert queue according to the fraud importance score.

12. The system according to claim 11, wherein the server is further configured to:
train the machine-learning model to determine the risk score corresponding to a particular type of fraud in an attribute value, by applying the machine-learning model on training contact data and the fraud importance score of each fraud event in the training contact data.

13. The system according to claim 11, wherein to generate the fraud importance score the server is further configured to:
receive from a client device fraud event feedback corresponding to each fraud event, the fraud event feedback containing one or more detection accuracy indicators; and
generate a false negative attribute value based upon the one or more detection accuracy indicators of the fraud event feedback, wherein the fraud importance score is generated based upon the false negative attribute value.

14. The system according to claim 11, wherein to generate the fraud importance score the server is further configured to:
generate an age-based attribute value based upon a timestamp in the contact data for the contact, wherein the fraud importance score is generated based upon the age-based attribute value.

15. The system according to claim 11, wherein to generate the fraud importance score the server is further configured to:
for the contact data of each contact of the one or more contacts:
generate a normalized weight as the attribute weight in accordance with the attribute and the attribute value, wherein the fraud importance score is generated based upon the normalized weight generated for the contact data of the particular contact.

16. The system according to claim 15, wherein to generate the normalized weight the server is further configured to:
convert the attribute weight representing a ranking for the attribute value to the normalized weight.

17. The system according to claim 11, wherein to apply the machine-learning architecture the server is further configured to:
select a machine-learning model corresponding to a type of fraud in accordance with an attribute, an attribute value, and an attribute weight, wherein the attribute value indicates the type of fraud and the attribute weight indicates the comparative importance for the attribute value.

18. The system according to claim 11, wherein the one or more attributes include at least one of: the type of fraud, a fraud activity, a cross-channel fraud activity, a penetration level associated with authentication, account information, fraudster identity, and spoofing information.

19. The system according to claim 18, wherein to apply the machine-learning model the server is further configured to:
extract one or more features from the contact data of the contact for applying the machine-learning model selected by the computer.

20. The system according to claim 11, wherein the server is further configured to:
transmit a fraud alert notification containing the fraud alert in the fraud alert queue to a client computer according to the fraud importance score.

* * * * *